United States Patent
Yamada et al.

(10) Patent No.: US 11,729,199 B2
(45) Date of Patent: *Aug. 15, 2023

(54) SECURITY EVALUATION SYSTEM, SECURITY EVALUATION METHOD, AND PROGRAM

(71) Applicant: NEC Corporation, Tokyo (JP)

(72) Inventors: Yoshiyuki Yamada, Tokyo (JP); Yoshinobu Ohta, Tokyo (JP); Masaki Inokuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 255 days.

This patent is subject to a terminal disclaimer.

(21) Appl. No.: 16/975,901

(22) PCT Filed: Mar. 27, 2018

(86) PCT No.: PCT/JP2018/012558
§ 371 (c)(1),
(2) Date: Aug. 26, 2020

(87) PCT Pub. No.: WO2019/186719
PCT Pub. Date: Oct. 3, 2019

(65) Prior Publication Data
US 2021/0006582 A1    Jan. 7, 2021

(51) Int. Cl.
*H04L 29/00*    (2006.01)
*H04L 9/40*    (2022.01)

(52) U.S. Cl.
CPC ........ *H04L 63/1433* (2013.01); *H04L 63/102* (2013.01)

(58) Field of Classification Search
CPC .... H04L 63/1433; H04L 63/102; G06F 21/57
See application file for complete search history.

(56) References Cited

U.S. PATENT DOCUMENTS

| | | | |
|---|---|---|---|
| 8,775,517 B1 * | 7/2014 | Goldman | G06F 16/951 709/204 |
| 8,881,288 B1 | 11/2014 | Levy et al. | |
| 8,924,406 B2 * | 12/2014 | Lunt | G06F 16/9535 707/727 |
| 9,092,631 B2 * | 7/2015 | Muller | G06F 21/577 |
| 9,100,430 B1 | 8/2015 | Seiver et al. | |
| 9,148,441 B1 * | 9/2015 | Tamersoy | G06F 21/567 |

(Continued)

FOREIGN PATENT DOCUMENTS

| | | | |
|---|---|---|---|
| JP | 2002-328893 A | 11/2002 | |
| JP | 2013-525927 A | 6/2013 | |

(Continued)

OTHER PUBLICATIONS

International Search Report for PCT Application No. PCT/JP2018/012558, dated Jul. 3, 2018.

*Primary Examiner* — Don G Zhao

(57) ABSTRACT

This security evaluation system includes a first graph generation part that generates a first evaluation graph representing a connection relationship between resources as a target for security evaluation; a second graph generation part that generates a second evaluation graph representing a personal relationship between areas where the resources are located; and display part that displays the first evaluation graph and the second evaluation graph in association with each other.

16 Claims, 33 Drawing Sheets

(56) References Cited

U.S. PATENT DOCUMENTS

| | | | | |
|---|---|---|---|---|
| 9,390,285 | B1* | 7/2016 | Dolas | G06F 21/604 |
| 9,558,265 | B1* | 1/2017 | Tacchi | G06F 16/338 |
| 9,710,544 | B1* | 7/2017 | Smith | G06F 16/36 |
| 9,912,683 | B2* | 3/2018 | Cam | H04L 63/1433 |
| 10,181,957 | B2* | 1/2019 | Srivastava | H04L 12/14 |
| 10,326,788 | B1* | 6/2019 | Bajpai | H04L 63/1416 |
| 10,430,441 | B1* | 10/2019 | Canton | H04W 12/08 |
| 10,606,866 | B1* | 3/2020 | Funk | G06F 16/9024 |
| 10,698,740 | B2* | 6/2020 | Busayarat | G06F 16/51 |
| 2012/0304301 | A1 | 11/2012 | Izukura | |
| 2013/0111548 | A1 | 5/2013 | Kanoun et al. | |
| 2013/0311905 | A1* | 11/2013 | Czyzewicz | H04L 63/20 |
| | | | | 715/753 |
| 2014/0324503 | A1* | 10/2014 | Whittaker | G06Q 50/01 |
| | | | | 704/9 |
| 2015/0106941 | A1* | 4/2015 | Muller | G06F 21/577 |
| | | | | 726/25 |
| 2018/0103052 | A1* | 4/2018 | Choudhury | G06N 3/08 |
| 2018/0196796 | A1* | 7/2018 | Wu | G06N 5/022 |
| 2018/0241768 | A1* | 8/2018 | Seiver | H04L 63/1433 |
| 2019/0286721 | A1* | 9/2019 | Sharma | G06F 16/24 |
| 2022/0129871 | A1* | 4/2022 | Rodgers | G06Q 20/108 |

FOREIGN PATENT DOCUMENTS

| | | | |
|---|---|---|---|
| JP | 2016-511847 | A | 4/2016 |
| JP | 2016-091402 | A | 5/2016 |
| JP | 6016982 | B1 | 10/2016 |
| JP | 2016-192176 | A | 11/2016 |
| JP | 2017-224053 | A | 12/2017 |
| WO | 2011/096162 | A1 | 8/2011 |

* cited by examiner

FIG. 6

| ASSET ID | ASSET NAME | OWNER USER ID |
|---|---|---|
| asset-node:1 | Firewall-1 | person-node:1 |
| asset-node:2 | Switch-1 | person-node:1 |
| asset-node:3 | Server-1 | person-node:1 |
| asset-node:4 | PC-1 | person-node:1 |
| asset-node:5 | PC-2 | person-node:2 |
| asset-node:6 | PLC-1 | person-node:2 |
| .. | .. | .. |

FIG. 7

| LINK ID | CONNECTION TYPE | START ASSET ID | END ASSET ID |
|---|---|---|---|
| asset-link:1 | Network | asset-node:1 | asset-node:2 |
| asset-link:2 | Network | asset-node:2 | asset-node:1 |
| asset-link:3 | Network | asset-node:2 | asset-node:3 |
| asset-link:4 | Network | asset-node:3 | asset-node:2 |
| asset-link:5 | USB | asset-node:3 | asset-node:5 |
| asset-link:6 | USB | asset-node:5 | asset-node:3 |
| .. | .. | .. | .. |

FIG. 9

| USER ID | USER NAME |
|---|---|
| person-node:1 | Person-1 |
| person-node:2 | Person-2 |
| .. | .. |

FIG. 10

| LINK ID | START USER ID | END USER ID |
|---|---|---|
| person-link:1 | person-node:1 | person-node:2 |
| person-link:2 | person-node:2 | person-node:1 |
| .. | .. | .. |

FIG. 12

| ATTACK ID | DETAILS OF ATTACK CONTENT | TARGET ASSET ID |
|---|---|---|
| attack-node:1 | EXECUTE ANY CODE BY USING VULNERABILITY OF CVE-YYYY-XXXX | asset-node:1 |
| attack-node:2 | TAMPER DATA FILE OF SOFTWARE A | asset-node:1 |
| attack-node:3 | COPY ANY FILE TO ACCESSIBLE NETWORK SHARED FOLDER | asset-node:2 |
| attack-node:4 | THEFT OF CREDENTIAL INFORMATION | asset-node:2 |
| attack-node:5 | COPY MALWARE Z TO USB MEMORY CONNECTED TO AFFECTED PC | asset-node:2 |
| .. | .. | .. |

FIG. 13

| LINK ID | START ATTACK ID | END ATTACK ID |
|---|---|---|
| attack-link:1 | attack-node:1 | attack-node:2 |
| attack-link:2 | attack-node:2 | attack-node:3 |
| attack-link:3 | attack-node:3 | attack-node:4 |
| attack-link:4 | attack-node:3 | attack-node:5 |
| attack-link:5 | attack-node:4 | attack-node:5 |
| .. | .. | .. |

FIG. 22

| ASSET ID | ASSET USE RIGHT |
|---|---|
| asset-node:1 | User-1, Uesr-2 |
| asset-node:2 | User-2, Group-1 |
| asset-node:3 | User-1 |
| asset-node:4 | Group-2 |
| asset-node:5 | User-2 |
| asset-node:6 | Administrator |
| .. | .. |

FIG. 25

| ASSET ID | ASSET NAME | OWNER USER ID | ASSET USE RIGHT |
|---|---|---|---|
| asset-node:1 | Firewall-1 | person-node:1 | User-1, Uesr-2 |
| asset-node:2 | Switch-1 | person-node:1 | User-2, Group-1 |
| asset-node:3 | Server-1 | person-node:1 | User-1 |
| asset-node:4 | PC-1 | person-node:1 | Group-2 |
| asset-node:5 | PC-2 | person-node:2 | User-2 |
| asset-node:6 | PLC-1 | person-node:2 | Administrator |
| .. | .. | .. | .. |

FIG. 27

| ASSET ID | ASSET TYPE | ASSET NAME | OWNER USER ID |
|---|---|---|---|
| asset-node:1 | Security Appliance | Firewall-1 | person-node:1 |
| asset-node:2 | Network Equipment | Switch-1 | person-node:1 |
| asset-node:3 | Computer | Server-1 | person-node:1 |
| asset-node:4 | Computer | PC-1 | person-node:1 |
| asset-node:5 | Computer | PC-2 | person-node:2 |
| asset-node:6 | PLC | PLC-1 | person-node:2 |
| .. | .. | .. | .. |

SECURITY EVALUATION SYSTEM, SECURITY EVALUATION METHOD, AND PROGRAM

This application is a National Stage Entry of PCT/JP2018/012558 filed on Mar. 27, 2018, the contents of all of which are incorporated herein by reference, in their entirety.

FIELD

The present invention relates to a security evaluation system, a security evaluation method, and a program.

BACKGROUND

PATENT LITERATURE (PTL) 1 discloses a security countermeasure support apparatus that can propose a security countermeasure execution portion that enables effective business protection in a target system. According to the gazette, this security countermeasure support apparatus includes an external storage device storing attribute information of each subsystem constituting each task in the target system. The security countermeasure support apparatus 10 includes an arithmetic unit that performs a process of applying the attribute information of each subsystem of each task to a predetermined algorithm to determine a risk level of each subsystem for each task. The arithmetic unit executes a process of determining the importance of the task by applying the determined risk level or attribute information to a predetermined algorithm and a process of calculating the number of tasks related to each subsystem based on the attribute information. Further, the arithmetic unit calculates the implementation priority of the security countermeasure for each subsystem based on the importance of each subsystem and the size of the number of tasks, and outputs information on the implementation priority to a predetermined apparatus.

PATENT LITERATURE 2 discloses a risk evaluation system that evaluates vulnerability risks based on the system configuration and topology in addition to the technical characteristics of each vulnerability and performs highly effective risk evaluation in response to the actual system status. The risk evaluation server that forms the risk evaluation system includes an apparatus that forms the target system of the risk evaluation, a network, and a storage device that stores information on vulnerability in association with each other. In addition, the risk evaluation server has an arithmetic unit that applies the above-described information to a predetermined algorithm based on graph theory and creates a risk evaluation model that defines an influence relationship of vulnerability according to the arrangement of each device on the network. Further, the arithmetic unit of the risk evaluation server applies the risk evaluation model to a predetermined inference algorithm, evaluates a risk caused by vulnerability in the target system, and outputs the evaluation result to the predetermined device.

PATENT LITERATURE 3 discloses a confidentiality analysis support system that can analyze a risk in consideration of a flow of a threat generated depending on a physical configuration status of a system to be analyzed. The confidentiality analysis support system includes attack flow model generation means for giving information indicating a function of the apparatus to a structural model representing a physical connection status of an apparatus constituting the information system and a behavior model representing a processing flow performed on the apparatus. Then, the attack flow model generation means generates an attack flow model representing an attack flow that may occur as a model for analyzing confidentiality in the information system.

PATENT LITERATURE 4 discloses a vulnerability risk evaluation system that can evaluate a risk related to vulnerability of a system that performs information processing on a predetermined business. This vulnerability risk evaluation system includes a vulnerability detection part that detects a vulnerability of an apparatus based on system configuration information and security information. The vulnerability risk evaluation system includes an apparatus risk evaluation model generation part that generates an apparatus risk evaluation model that evaluates a risk that a vulnerability may cause on an apparatus by arranging a vulnerability node and an apparatus node in association with each other. Further, the vulnerability risk evaluation system includes a business-related risk evaluation model generation part. The business-related risk evaluation model generation part additionally arranges the business-related node in the apparatus risk evaluation model and associates the business-related node with the apparatus node. Further, the business-related risk evaluation model generation part generates a business-related risk evaluation model for evaluating a risk that detected vulnerability may cause in a predetermined business process.

In addition, as a method of analyzing various methods for attacking an information system, a method using an attack graph has been studied. For example, PATENT LITERATURE 5 discloses a method for determining whether or not to implement a security policy with reference to the attack model when an attack is detected using an attack model prepared in advance.

PATENT LITERATURE 1: Japanese Patent Kokai Publication No.JP-P2016-192176A

PATENT LITERATURE 2: Japanese Patent Kokai Publication No.JP-P2016-091402A

PATENT LITERATURE 3: International Publication Number WO2011/096162A1

PATENT LITERATURE 4: Japanese Patent Kokai Publication No.JP-P2017-224053A

PATENT LITERATURE 5: Japanese Patent Kohyou Publication No.JP-P2013-525927A

SUMMARY

The following analysis has been made by the present invention. In the attack graph of FIG. 3 of PATENT LITERATURE (PTL) 5, an operation (attack action) that causes a state transition of the system is modeled as a node and order of occurrence of the attack action is represented by a link. On the other hand, in actual information systems, although measures for physically separating resources and networks or the like are taken in addition to various security countermeasures, there is a problem that it is difficult to grasp an effect of the separation and to take countermeasures with the above attack model alone.

As a typical example, an example of a computer worm called Stuxnet is taken. Stuxnet infects a target standalone computer via a Universal Serial Bus (USB) memory by way of a PC (Personal Computer) serving as a springboard. To prevent such infections, it is necessary to grasp paths of infection and take effective countermeasures, but it is difficult to assess the risk before an incident occurs.

It is an object of the present invention to provide a security evaluation system, a security evaluation method, and a program that contribute to enrichment of security evaluation schemes of an information system.

Solution to Problem

According to a first aspect, there is provided a security evaluation system, including a first graph generation part that generates a first evaluation graph representing a connection relationship between resources as a target for security evaluation; a second graph generation part that generates a second evaluation graph representing a personal relationship between users who can access the resources; and a display part that displays the first evaluation graph and the second evaluation graph in association with each other.

According to a second aspect, there is provided a security evaluation method, including generating a first evaluation graph representing a connection relationship between resources as a target for security evaluation; generating a second evaluation graph representing a personal relationship between users who can access the resources; and displaying the first evaluation graph and the second evaluation graph in association with each other. The present method is tied to a particular machine, namely, a computer having a function to generate and display a first evaluation graph and a second evaluation graph.

According to a third aspect, there is provided a program, causing a computer having a processor and a memory device to perform processes of: generating a first evaluation graph representing a connection relationship between resources as a target for security evaluation; generating a second evaluation graph representing a personal relationship between users who can access the resources and displaying the first evaluation graph and the second evaluation graph in association with each other. Further, this program may be stored in a computer-readable (non-transitory) storage medium. In other words, the present invention can be realized as a computer program product.

Advantageous Effects of Invention

According to the present invention, it is possible to contribute to enrichment of security evaluation schemes of an information system.

BRIEF DESCRIPTION OF DRAWINGS

FIG. 6 illustrates an example of asset information held by the security evaluation system according to the first exemplary embodiment of the present invention.

FIG. 7 illustrates an example of inter-asset connection information held by the security evaluation system according to the first exemplary embodiment of the present invention.

FIG. 9 illustrates an example of user information held by the security evaluation system according to the first exemplary embodiment of the present invention.

FIG. 10 illustrates an example of inter-user relationship information held by the security evaluation system according to the first exemplary embodiment of the present invention.

FIG. 12 illustrates an example of attack action information held by the security evaluation system according to the first exemplary embodiment of the present invention.

FIG. 13 illustrates an example of attack procedure information held by the security evaluation system according to the first exemplary embodiment of the present invention.

FIG. 22 illustrates an example of asset use right information held by the security evaluation system according to the second exemplary embodiment of the present invention.

FIG. 25 illustrates another mode for holding asset use right information according to the second exemplary embodiment of the present invention.

FIG. 27 illustrates an example of asset information held by the security evaluation system according to the third exemplary embodiment of the present invention.

PREFERRED MODES

Figure 1:
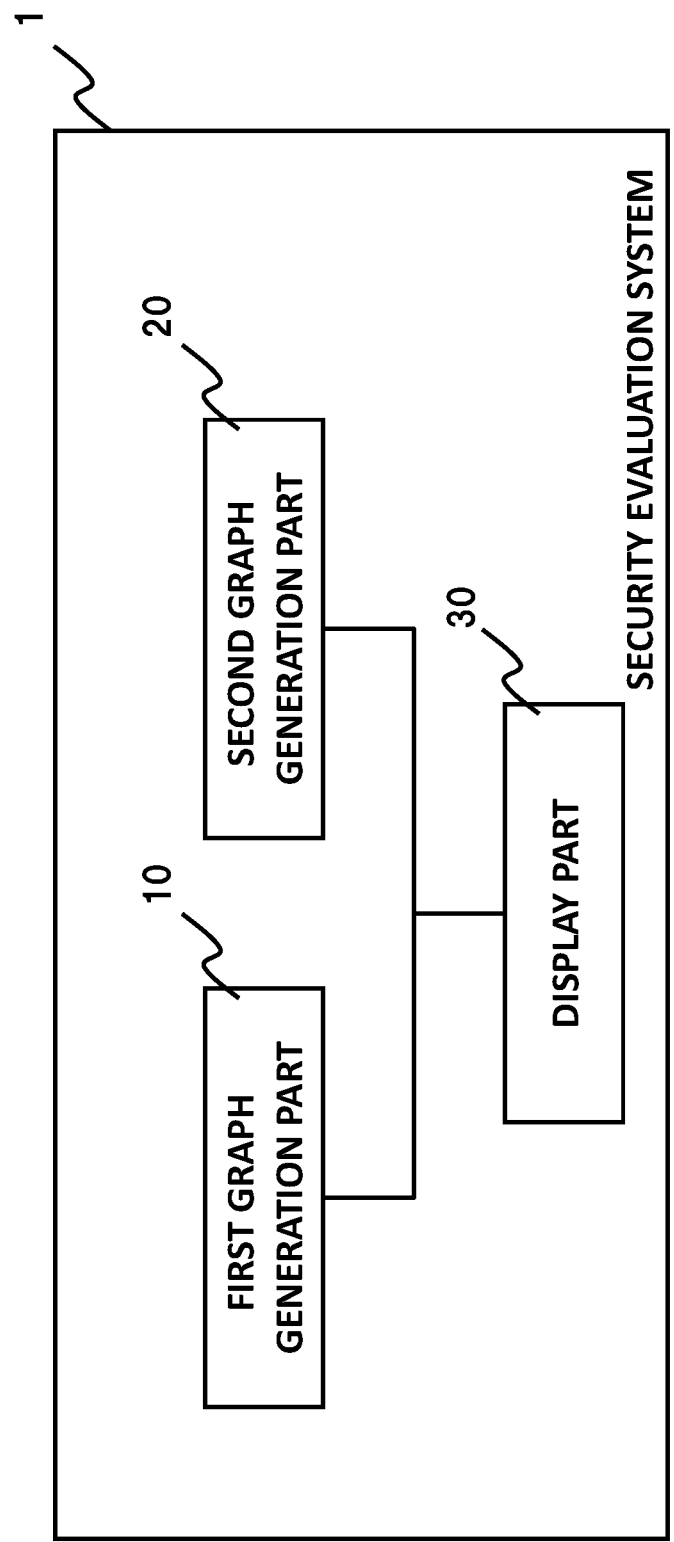
FIG. 1 illustrates a configuration of an exemplary embodiment of the present invention.

First, an outline of an exemplary embodiment according to the present invention will be described with reference to the drawings. In the following outline, reference characters of the drawings are denoted to various elements for the sake of convenience to facilitate understanding of the present invention and they are not intended to limit the present invention to the exemplary embodiment as shown in the drawings. Further, connection lines between blocks in the drawings and the like referred to in the following description include both bidirectional and unidirectional. The one-way arrow schematically shows the flow of a main signal (data), and it does not exclude bidirectionality.

According to exemplary embodiment of the present invention, as shown in FIG. 1, the present invention is realized by a security evaluation system 1 including a first graph generation part 10, a second graph generation part 20 and a display part 30.

More concretely, the first graph generation part 10 generates a first evaluation graph representing a connection relationship between resources as a target for security evaluation. The second graph generation part 20 generates a second evaluation graph representing a personal relationship between users who can access the resources. Further, the display part 30 displays the first evaluation graph and the second evaluation graph in association with each other.

Figure 2:
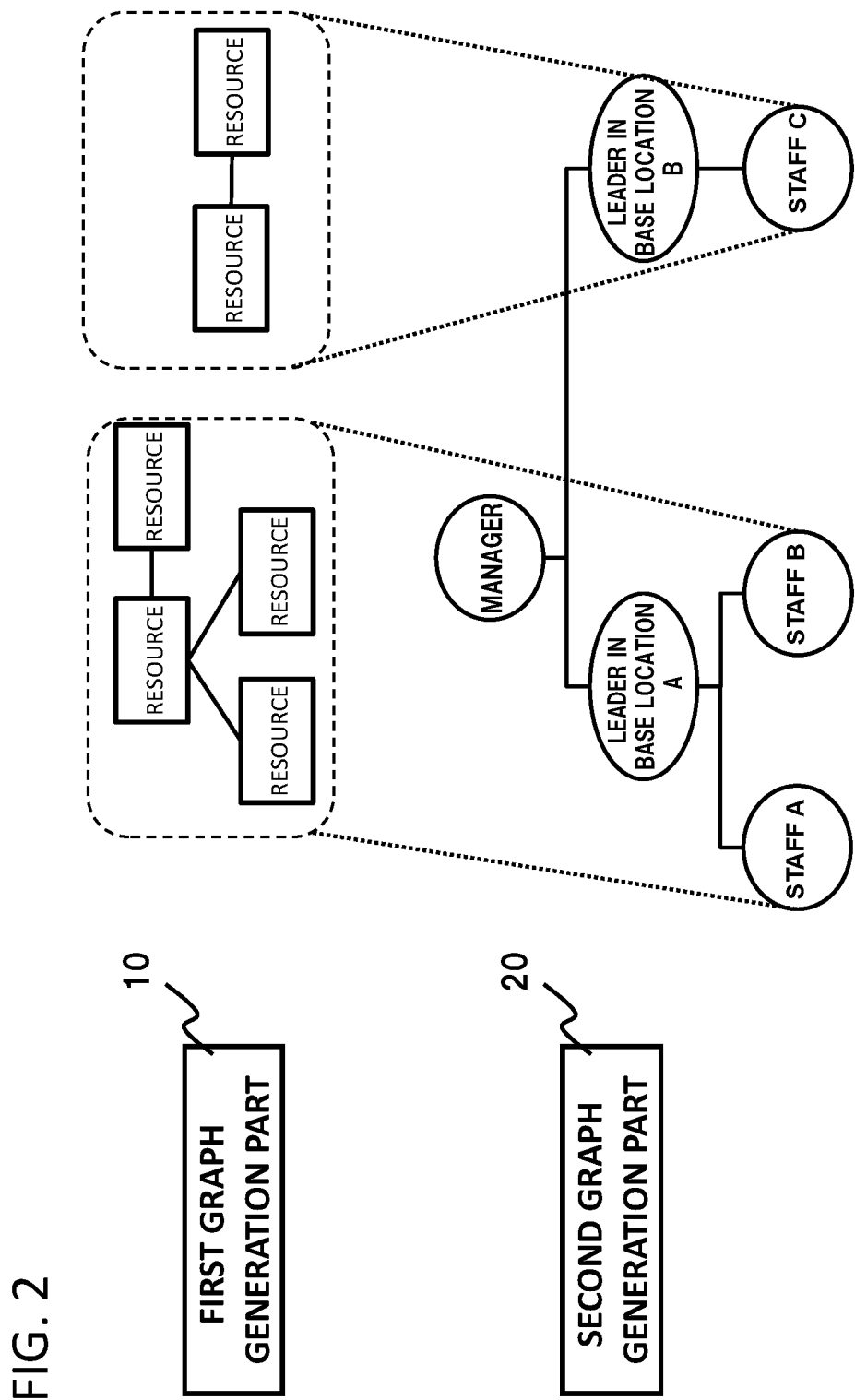
FIG. 2 illustrates an operation of an exemplary embodiment of the present invention.

FIG. 2 illustrates an operation of an exemplary embodiment of the present invention. As shown on the upper right side of FIG. 2, the first graph generation part 10 generates a first evaluation graph representing a connection relationship between resources as a target for security evaluation. Such a first evaluation graph can be generated with reference to, for example, network configuration information and so on, prepared in advance.

On the other hand, as shown in the lower right part of FIG. 2, the second graph generation part 20 generates a second evaluation graph representing a personal relationship between users who can access the resources. Such a second evaluation graph can be generated with reference to, for example, personnel information and organization structure information and so on prepared in advance. In the example of FIG. 2, it can be seen that a staff A and a staff B are located under a leader of a base location A, a staff C is located under a leader of a base location B and both leaders are located under a manager.

Then, the display part 30 displays the first evaluation graph and the second evaluation graph in association with each other, as shown by a broken line in FIG. 2. According to such graphs, on the first evaluation graph, although four resources on a left side and two resources on a right side are separated, it can be seen that they are connected from the viewpoint of persons who operate the resources. As for countermeasures against incidents via a USB memory or the like as typified by Stuxnet, it can be seen that a security policy may be revised or a check of belongings may be carried out when entering and exiting by paying attention to a personal connection in the second evaluation graph.

As described above, according to the present exemplary embodiment, it is possible to perform security evaluation in consideration of a personal connection that is difficult to grasp from a first evaluation graph representing a connection relationship between resources or an attack graph.

First Exemplary Embodiment

Next, a first exemplary embodiment of the present invention that can display an assessment graph in which three layers including an attack graph in addition to the first and second evaluation graphs are integrated will be described with reference to the drawings in detail. In the following description, "asset" corresponds to the "resource" as described above. That is, the term "asset" in the following description can be replaced with "resource".

Figure 3:
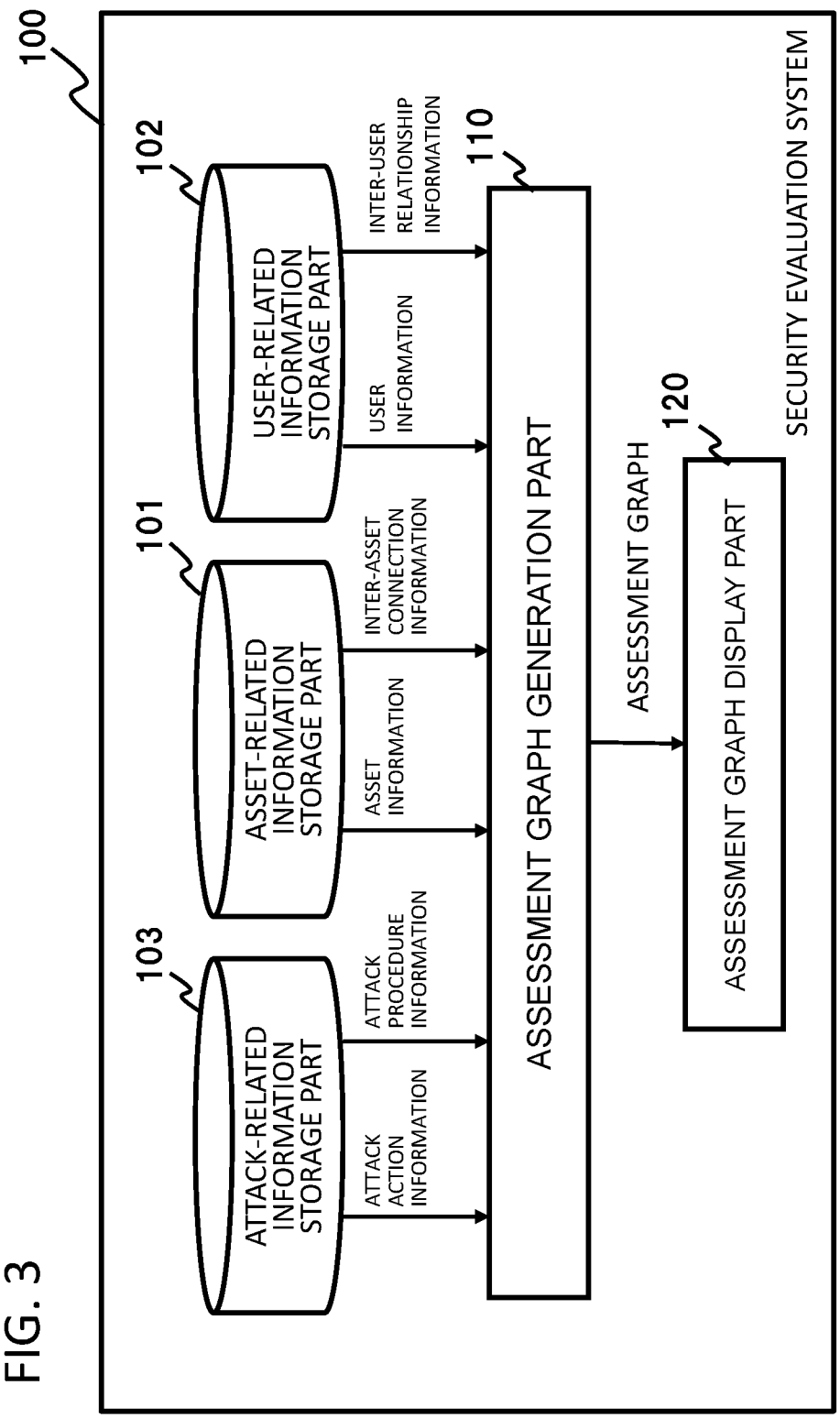
FIG. 3 illustrates a configuration of a security evaluation system according to a first exemplary embodiment of the present invention.

FIG. 3 illustrates a configuration of a security evaluation system according to a first exemplary embodiment of the present invention. Referring to FIG. 3, a configuration including an asset-related information storage part 101, a user-related information storage part 102, an attack-related information storage part 103, an assessment graph generation part 110 and an assessment graph display part 120 is shown.

The asset-related information storage part 101 stores asset information and inter-asset connection information. The user-related information storage part 102 stores user information and inter-user relationship information. The attack-related information storage part 103 stores attack action information and attack procedure information. Concrete examples thereof will be described later in detail with reference to the drawings.

Figure 16:
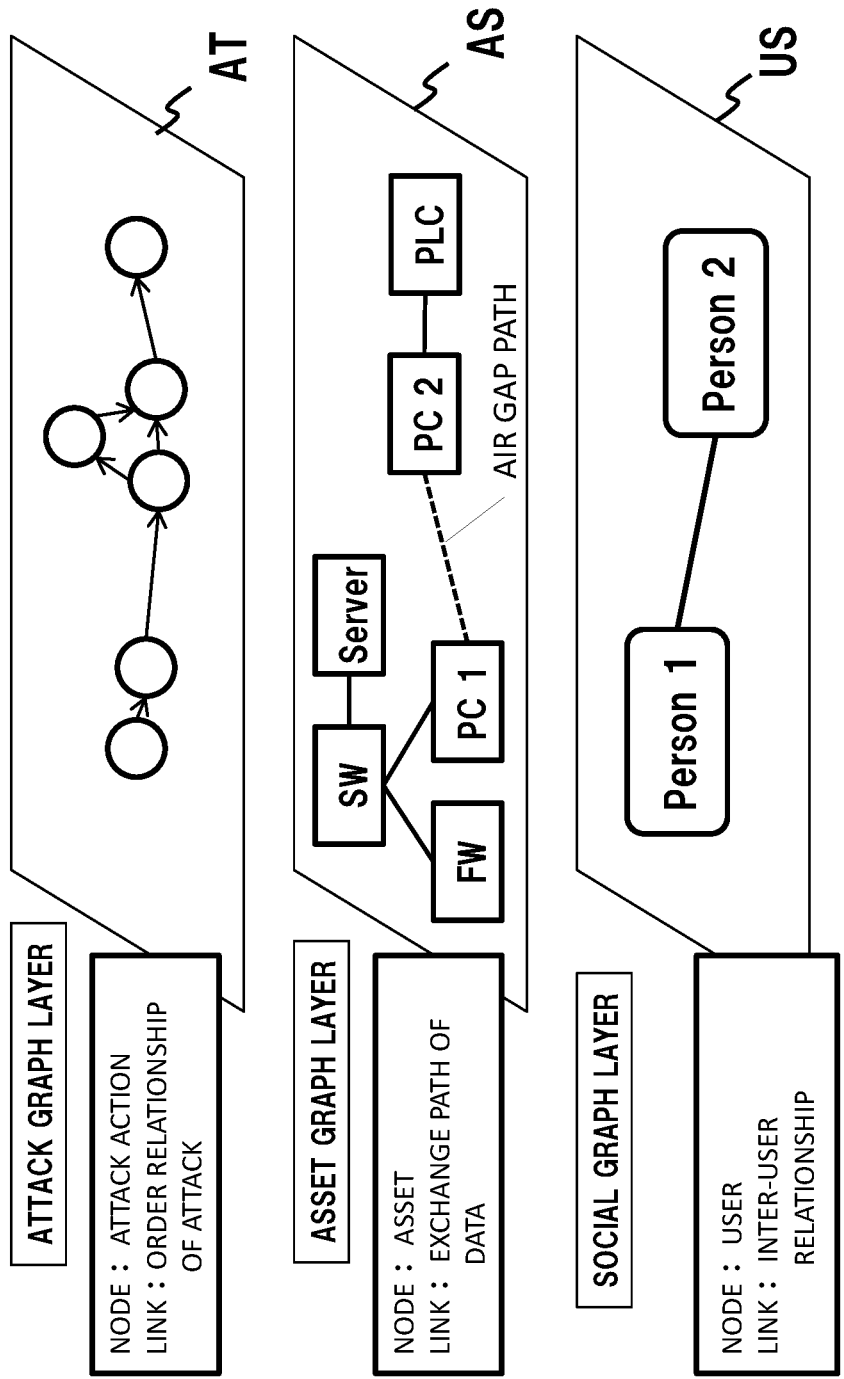
FIG. 16 illustrates an example of an assessment graph displayed by the security evaluation system according to the first exemplary embodiment of the present invention.
Figure 17:
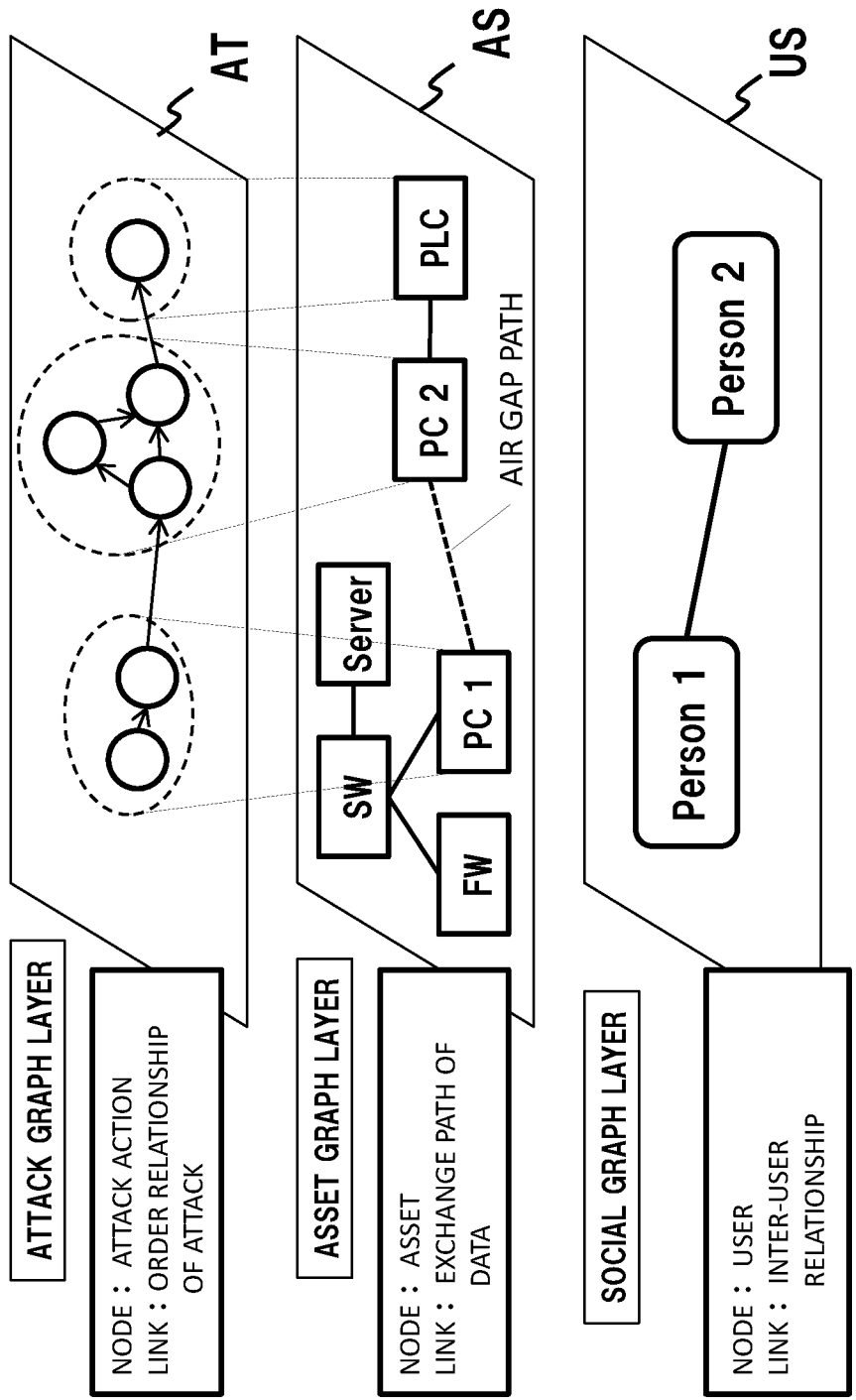
FIG. 17 illustrates another example of an assessment graph displayed by the security evaluation system according to the first exemplary embodiment of the present invention.
Figure 18:
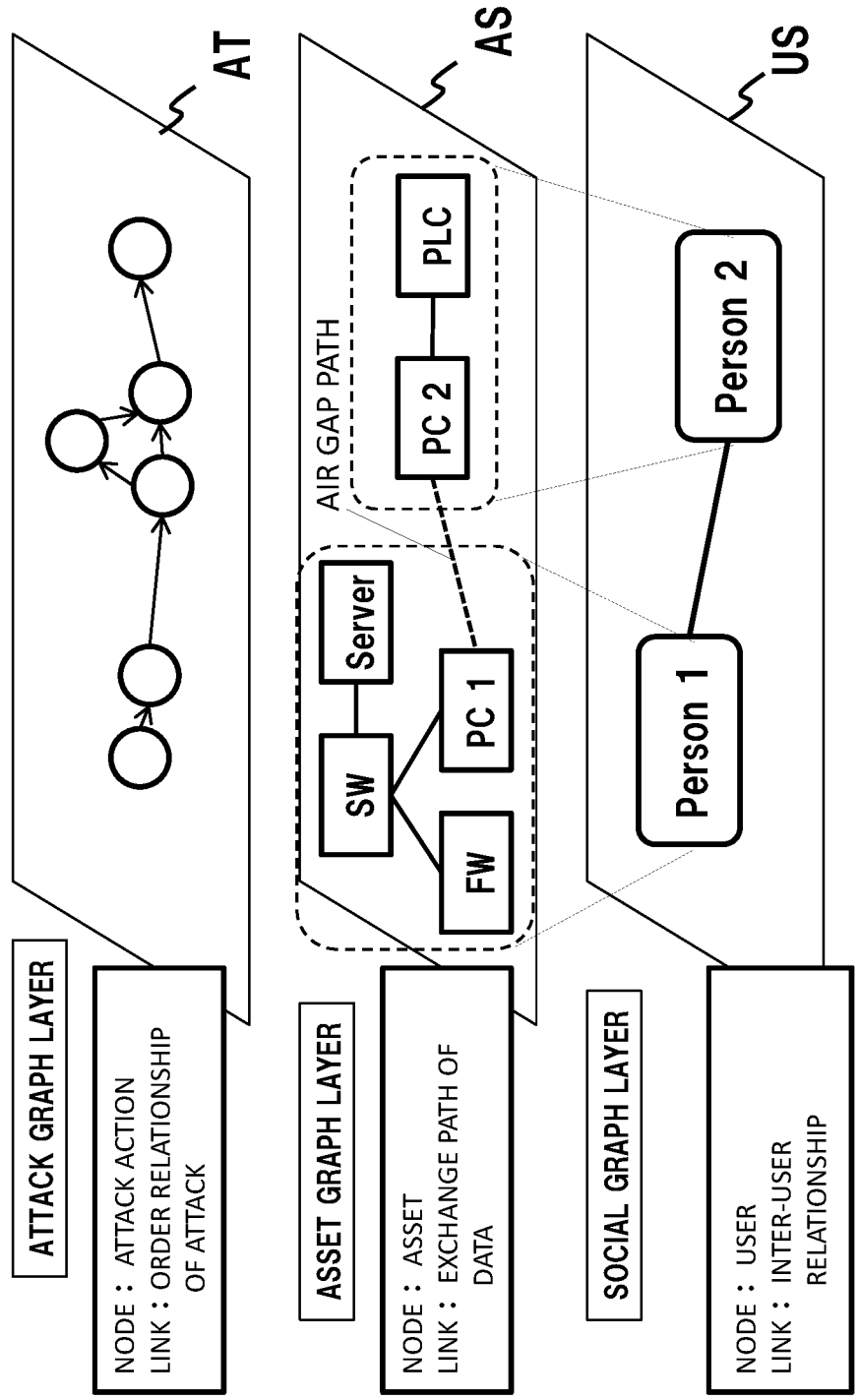
FIG. 18 illustrates other example of an assessment graph displayed by the security evaluation system according to the first exemplary embodiment of the present invention.

The assessment graph generation part 110 generates an assessment graph as exemplified by FIGS. 16 to 18 using information obtained from the asset-related information storage part 101, the user-related information storage part 102 and the attack-related information storage part 103.

The assessment graph display part 120 graphically displays the assessment graphs as exemplified by FIGS. 16 to 18.

Figure 4:
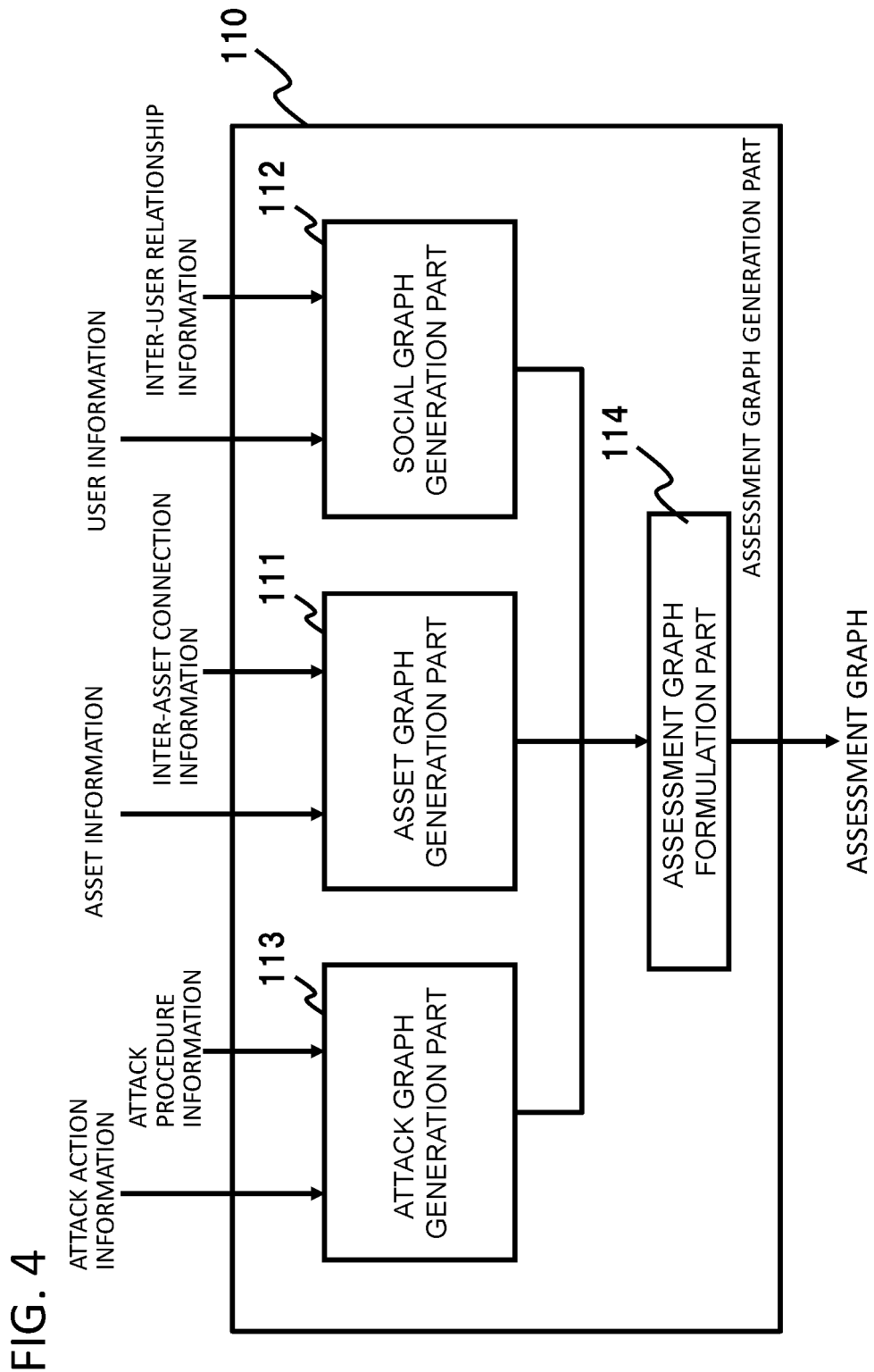
FIG. 4 illustrates an example of a configuration of an assessment graph generation part of the security evaluation system according to the first exemplary embodiment of the present invention.

Next, a detailed configuration of the assessment graph generation part 110 will be described. FIG. 4 illustrates an example of a configuration of the assessment graph generation part of the security evaluation system according to the first exemplary embodiment of the present invention. Referring to FIG. 4, a configuration including an asset graph generation part 111, a social graph generation part 112, an attack graph generation part 113 and an assessment graph formulation part 114 is shown.

The asset graph generation part 111 generates an asset graph using an asset information and an inter-asset connection information as inputs. The asset graph is a graph representing a connection relationship between assets of a target system for evaluation and corresponds to the above-described first evaluation graph.

The social graph generation part 112 generates a social graph using user information and inter-user relationship information as inputs. The social graph is a graph representing a relationship (personal connection) between users who can access the resources of the target system for evaluation and corresponds to the above-described second evaluation graph. The concrete operation of the social graph generation part 112 will be described later in detail.

The attack graph generation part 113 generates an attack graph using attack action information and attack procedure information as inputs. The attack graph is a graph representing an assumed attack procedure to the target system for evaluation in the form of a state transition graph. Various modes of the attack graph have been proposed and in the present exemplary embodiment, it is explained using an attack graph in which the attack action of the attacker is represented as a node, and order relationship thereof is represented by a link (arrow). A concrete operation of the attack graph generation part 113 will be described later in detail.

The assessment graph formulation part 114 formulates the assessment graph that hierarchically displays the above-described asset graph, the social graph and the attack graph in association with each other (see FIGS. 16 to 18). Concrete aspects of the assessment graph and its effect will be described later in detail.

Figure 5:
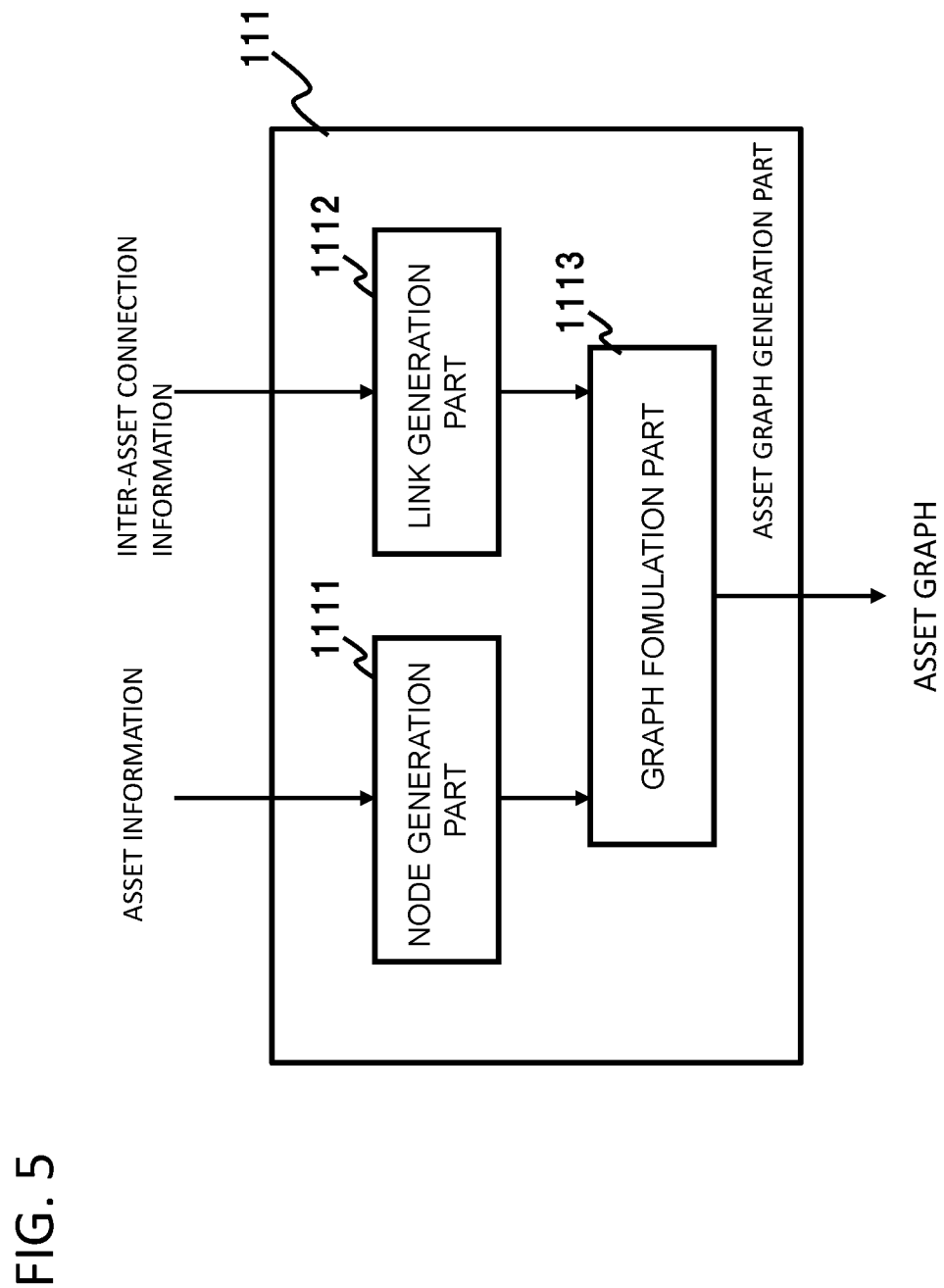
FIG. 5 illustrates an example of a configuration of an asset graph generation part of the security evaluation system according to the first exemplary embodiment of the present invention.

Next, an example of a concrete configuration of the above-described asset graph generation part 111, social graph generation part 112 and attack graph generation part 113 will be described. FIG. 5 illustrates an example of a configuration of the asset graph generation part 111. Referring to FIG. 5, a configuration including a node generation part 1111, a link generation part 1112 and a graph formulation part 1113 is shown.

The node generation part 1111 of the asset graph generation part 111 generates a node on an asset graph based on asset information.

FIG. 6 illustrates an example of asset information held by the asset-related information storage part 101 In the example as shown in FIG. 6, an entry in which an asset ID uniquely indicating an asset, an asset name and an owner user ID are associated is shown. For example, it is represented that the asset of asset-node:1 is a firewall device named Firewall-1 and a user identified by person-node:1 has an ownership. Meaning of a term "ownership" includes not only a narrow sense but also a relationship in which a user has a responsibility of management for an asset concerned. In FIG. 6, PLC stands for Programmable Logic Controller.

For example, the node generation part 1111 of the asset graph generation part 111 generates a node corresponding to asset-node:1 based on the asset information.

The link generation part 1112 of the asset graph generation part 111 generates a link on the asset graph based on the inter-asset connection information.

FIG. 7 illustrates an example of the inter-asset connection information held by the asset-related information storage part 101. In the example of FIG. 7, entries are shown in which a link ID uniquely indicating a link between assets, connection type information of the link, a start asset ID and an end asset ID are associated with each other. For example, it is represented that a link of asset-link: 1 is connected by a network and is a link between asset-node:1 and asset-node:2. In the example of FIG. 7, connection type information includes USB in addition to Network. USB indicates a data exchange path through transfer of a medium such as USB. A data exchange path through transfer of such a medium can be grasped through log information of a target device, an interview survey with a user, on-site observation, and so on. Further, only the USB is illustrated in the example of FIG. 7, but medium that can configure data exchange paths through transfer of the medium is not limited to this.

For example, the exchange by inserting/removing other removable disks or modes by using a short-range wireless communication device as a medium are also applicable. Hereinafter, such a data exchange path though transfer of a medium is also referred to as an "air gap path".

The graph formulation part 1113 of the asset graph generation part 111 generates an asset graph formulated by the nodes and links (see the middle part of FIGS. 16 to 18).

Figure 8:
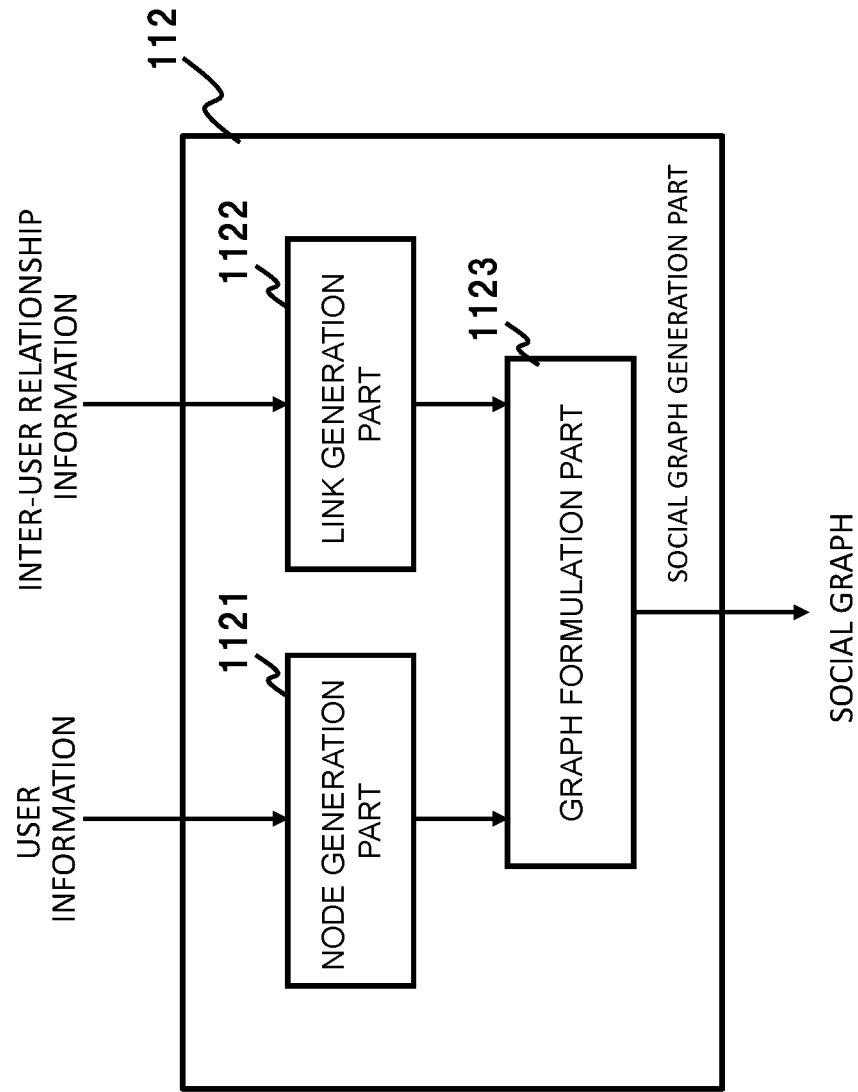
FIG. 8 illustrates an example of a configuration of a social graph generation part of the security evaluation system according to the first exemplary embodiment of the present invention.

FIG. 8 is a diagram illustrating a configuration example of a social graph generation part 112. Referring to FIG. 8, a configuration including a node generation part 1121, a link generation part 1122 and a graph formulation part 1123 is represented.

The node generator 1121 of the social graph generator 112 generates a node on a social graph based on user information.

FIG. 9 illustrates an example of user information held by user-related information storage part 102. In the example of FIG. 9, entries are shown in which a user ID uniquely indicating a user is associated with a user name. For example, it is represented that the user of person-node:1 has a name of Person-1. In the example of FIG. 9, although only user name is defined, attribute information such as a department of each user or an organization to which a user belongs may be stored as user information.

For example, the node generation part 1121 of the social graph generation part 112 generates a node corresponding to person-node:1 based on the user information.

The link generation part 1122 of the social graph generation part 112 generates a link on a social graph based on the inter-user relationship information. This link represents a relationship between users, for example, a relationship under which data may be exchanged through a medium.

FIG. 10 illustrates an example of inter-user relationship information held by the user-related information storage part 102. In the example of FIG. 10, entries are shown in which a link ID uniquely indicating a link between users, a start user ID and an end user ID are associated with each other. For example, it is represented that a link of person-link:1 is a link between person-node:1 and person-node:2. It should be noted that connection type information of the link may be included in the inter-user relationship information. As connection type information of a link between users, it is possible to include information as to whether or not there is a vertical relationship such as the relationship between a boss and a subordinate and whether there is a horizontal relationship such as colleagues, the same group, or the same circle. As inter-user relationship information, it is possible to use information regarding a friend or an acquaintance on a SNS (Social Networking Service). Furthermore, more preferably, from the viewpoint of becoming a material for security countermeasure planning, only the connection that has a relationship under which a medium can be exchanged among the personal relationships between these users may be set as the inter-user relationship information.

The graph formulation part 1123 of the social graph generation part 112 generates asocial a graph formulated by the nodes and links (see the lower part of FIGS. 16 to 18).

Figure 11:
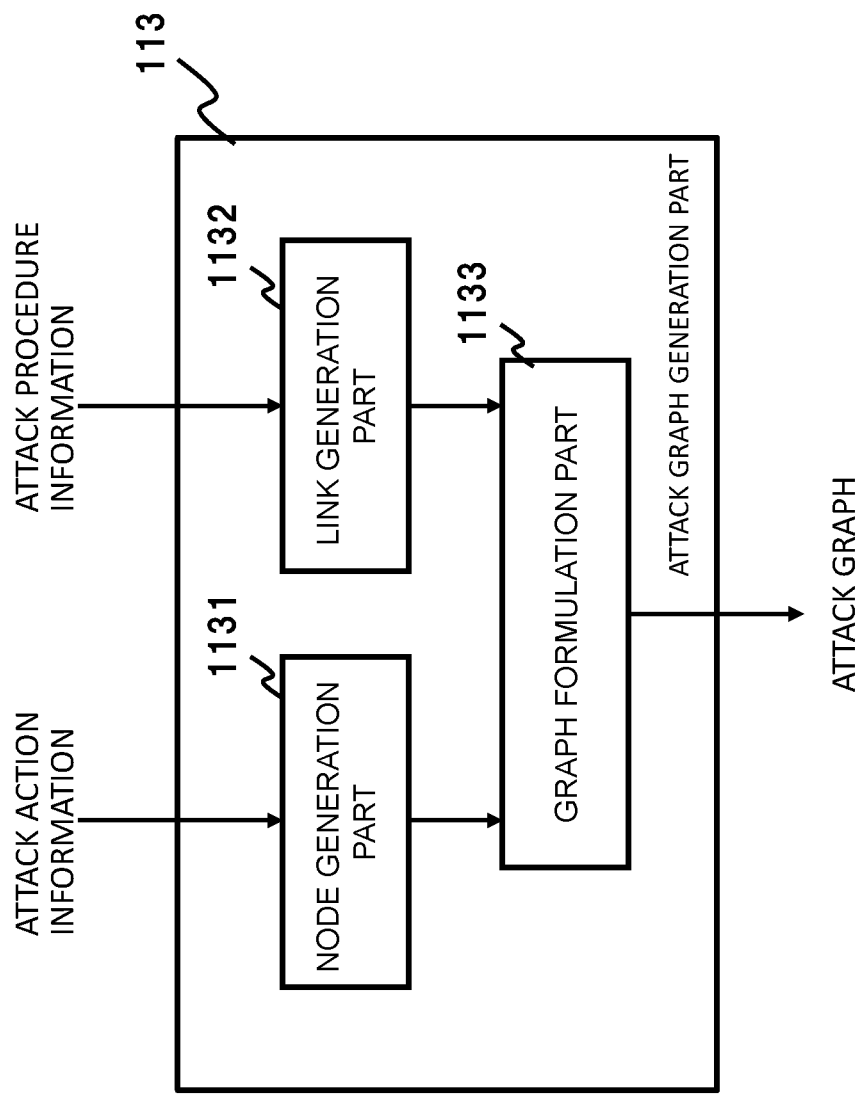
FIG. 11 illustrates an example of a configuration of an attack graph generation part of the security evaluation system according to a first exemplary embodiment of the present invention.

FIG. 11 illustrates an example of a configuration of an attack graph generation part 113. Referring to FIG. 11, a configuration including a node generation part 1131, a link generation part 1132 and a graph formulation part 1133 is represented.

The node generation part 1131 of the attack graph generation part 113 generates a node on an attack graph based on an attack action information.

FIG. 12 illustrates an example of attack action information held by the attack-related information storage part 103. In the example of FIG. 12, entries are shown in which an attack ID that uniquely indicates an attack action, details of the attack content and a target asset ID to be attacked are associated with each other. For example, an attack of attack-node:1 is to execute a specific code by using a vulnerability of a system and it is indicated that a target is asset-node:1.

For example, the node generation part 1131 of the attack graph generation part 113 generates a node corresponding to attack-node:1 based on the attack action information.

The link generation part 1132 of the attack graph generation part 113 generates a link on an attack graph based on an attack procedure information.

FIG. 13 illustrates an example of attack procedure information held by the attack-related information storage part 103. In the example of FIG. 13, entries are shown in which a link ID uniquely indicating a link between attacking actions, a start attack ID indicating a start node and an end attack ID indicating an end node are associated with each other. For example, it is shown that the link of attack-link:1 is a link between attack-node:1 and attack-node:2.

The graph formulation part 1133 of the attack graph generation part 113 generates an attack graph formulated by the nodes and the links (see the upper part of FIGS. 16 to 18).

Figure 14:
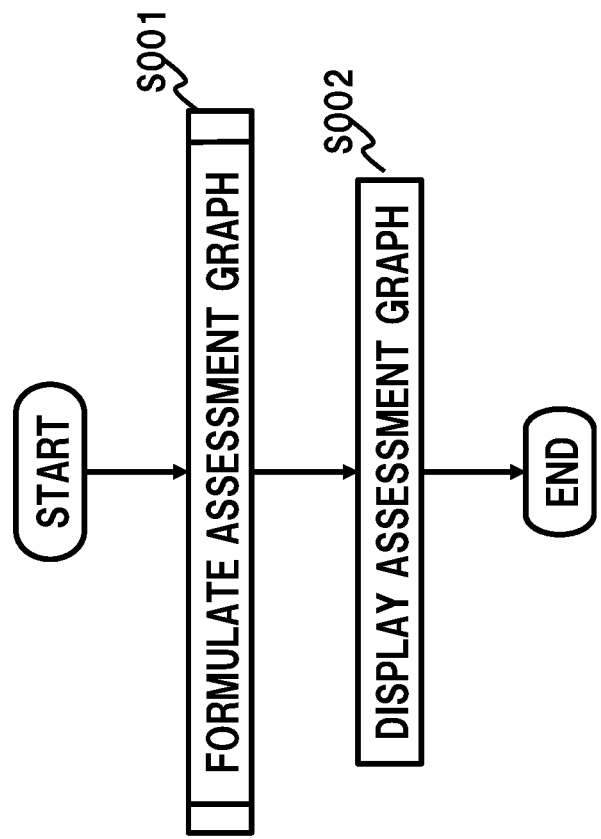
FIG. 14 illustrates a flowchart of an operation of the security evaluation system according to the first exemplary embodiment of the present invention.
Figure 15:
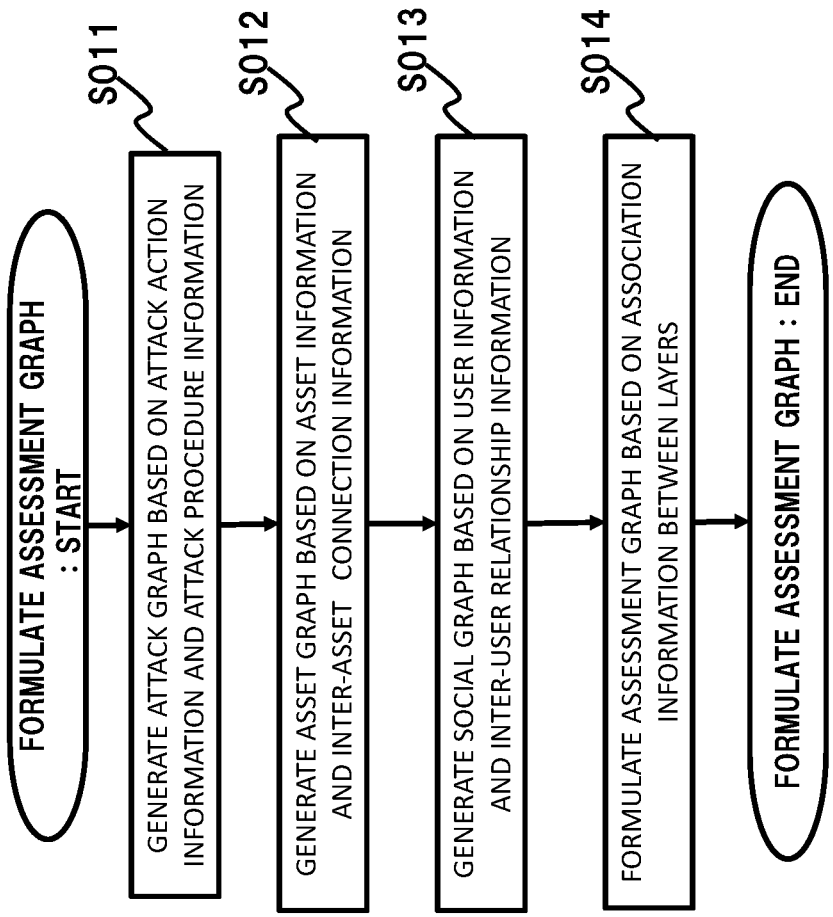
FIG. 15 illustrates a flowchart representing an example of an assessment graph generation process of the security evaluation system according to the first exemplary embodiment of the present invention.

Next, the operation of the present exemplary embodiment will be described in detail with reference to the drawings. FIG. 14 illustrates a flowchart of an operation of a security evaluation system according to a first exemplary embodiment of the present invention. Referring to FIG. 14, first, an assessment graph generation part 110 of the security evaluation system 100 formulates an assessment graph. FIG. 15 is a flowchart illustrating an example of an assessment graph generation process performed by the assessment graph generation part 110.

Referring to FIG. 15, the attack graph generation part 113 of the security evaluation system 100 generates an attack graph based on attack action information and attack procedure information (step S011).

Next, the asset graph generation part 111 of the security evaluation system 100 generates an asset graph based on the asset information and the inter-asset connection information (step S012).

Next, the social graph generation part 112 of the security evaluation system 100 generates a social graph based on the user information and the inter-user relationship information (step S013).

Finally, the assessment graph formulation part 114 of the security evaluation system 100 formulates an assessment graph based on association information between layers of the above-described asset graph, the social graph and the attack graph (step S014). Here, the "association information between layers" refers to information indicating a corresponding relationship with a node of a different layer resided in information of a certain layer, such as an owner user ID in asset information and a target asset ID in attack action information.

Referring again to FIG. 14, the assessment graph display part 120 of the security evaluation system 100 displays the formulated assessment graph (step S002).

FIG. 16 illustrates an example of an assessment graph displayed at a stage of step S002. This assessment graph has a three layered structure and an attack graph layer AT in the top row displays an attack graph in which assumed attack actions are represented as nodes, respectively, and a relation of order between the attacks is indicated by a link (arrow), respectively. An asset graph layer AS in the middle row displays an asset graph in which assets of a system to be evaluated are represented as nodes and data exchange paths between assets are represented by links. The asset graph can also display a data exchange path (air gap path) through a medium such as a USB, and so on. In a social graph layer US, in the bottom row, a social graph is displayed in which users who can have an ownership relationship with assets are set as nodes and a relationship between users is represented by a link. In FIG. 16, SW stands for Switch, and FW stands for Firewall.

FIG. 17 illustrates another display mode of an assessment graph. In the example of FIG. 17, the correspondences between PC1, PC2 and PLC on an asset graph and nodes of an attack graph are indicated by broken lines. Such broken lines can be displayed by using the above-mentioned "association information between layers". By looking at such a display, an evaluator of a system can grasp that the attack graph of FIG. 17 is established on the premise that an air gap path exists.

FIG. 18 illustrates another display mode of an assessment graph. In the example of FIG. 18, the correspondences between Persons 1, 2 on a social graph and asset groups on an asset graph are indicated by broken lines. Such broken lines can be displayed by using the above-mentioned "association information between layers". By looking at such a display, the evaluator of the system can determine he should take countermeasure against a relationship between the Person 1 and the Person 2 represented on the social graph in order to block the attack through the air gap path, which is the premise of the attack graph in the top raw of FIG. 18.

In the examples of FIGS. 16 to 18 described above, a node(s) in an attack graph layer is/are associated with any node in an asset graph layer based on asset information of a target for an attack. This means that nodes in the asset graph layer are defined as a group (superset) that encompasses nodes in the attack graph layer. Similarly, a node(s) in the asset graph layer is/are associated with any node in a social graph layer based on user information that has an ownership relationship with an asset(s). This means that a node of the social graph layer is defined as a group (superset) that encompasses node(s) of the asset graph layer. By adopting such a configuration, it further becomes easy to narrow down a point against which a countermeasure for a social graph layer should be taken by identifying node(s) in an asset graph from any node and path in any attack graph.

On the other hand, a display mode of an assessment graph is not limited to the examples shown in FIGS. 16 to 18. For example, only an asset graph may be displayed and an attack graph and a social graph may be displayed in a form of a pop-up display as needed. Further, a mode in which only an asset graph is displayed and a mode in which an assessment graph is displayed may be switched-over and displayed. According to such a mode, detailed information of each asset (for example, asset information in FIG. 6) can be displayed at the same time in case where only the asset graph is displayed.

Second Exemplary Embodiment

Figure 19:
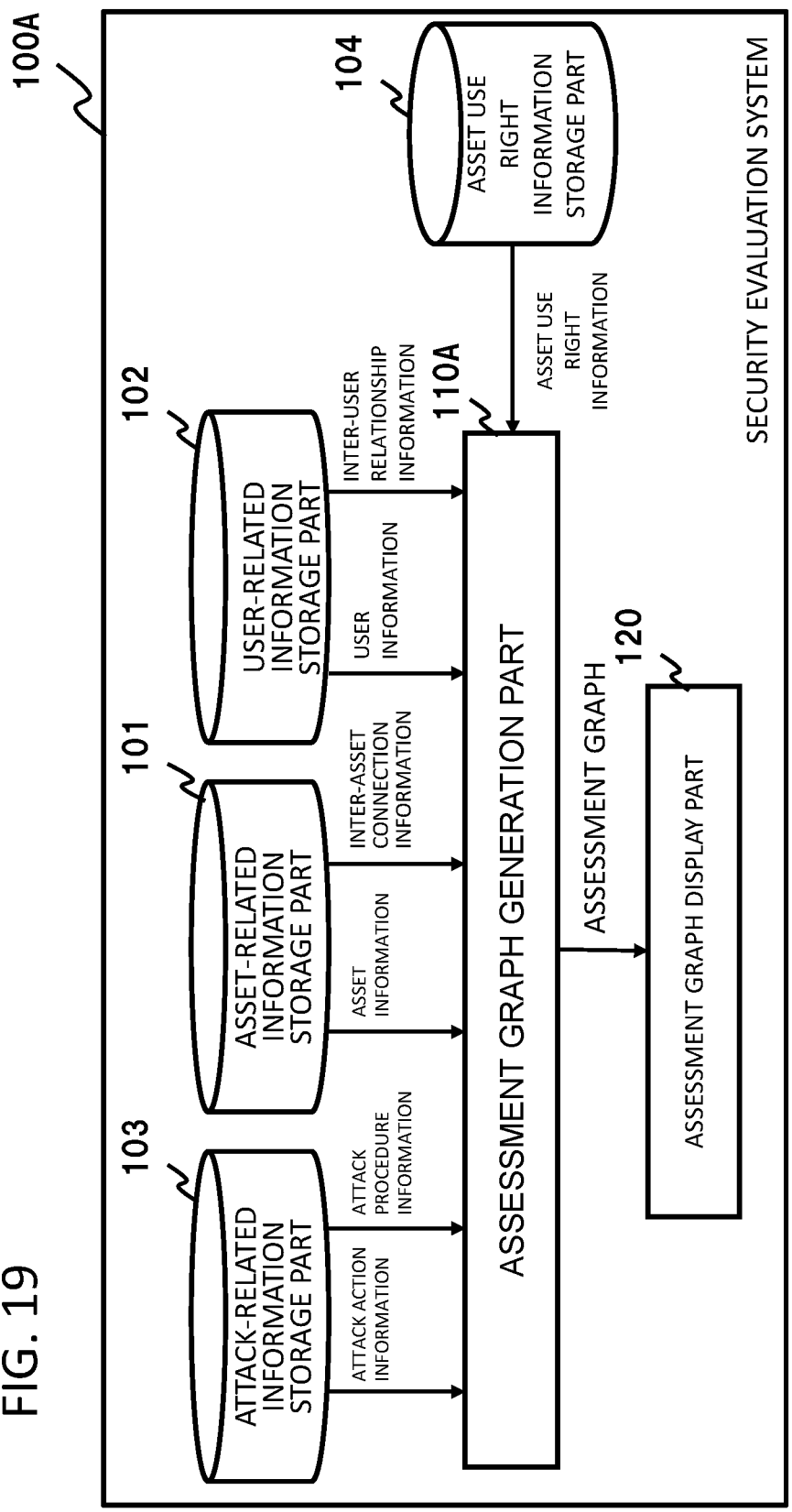
FIG. 19 illustrates a configuration of a security evaluation system according to a second exemplary embodiment of the present invention.

Next, a second exemplary embodiment in which display contents of a social graph are changed will be described in detail with reference to the drawings. FIG. 19 illustrates a configuration of a security evaluation system 100A according to a second exemplary embodiment of the present invention. The configuration difference from the security evaluation system 100 of the first exemplary embodiment shown in FIG. 3 is that an asset use right information storage part 104 is appended and an assessment graph generation part 110A generates an assessment graph including information on an asset use right. Other configurations are the same as those of the first exemplary embodiment and therefore the following description will focus on the differences.

Figure 20:
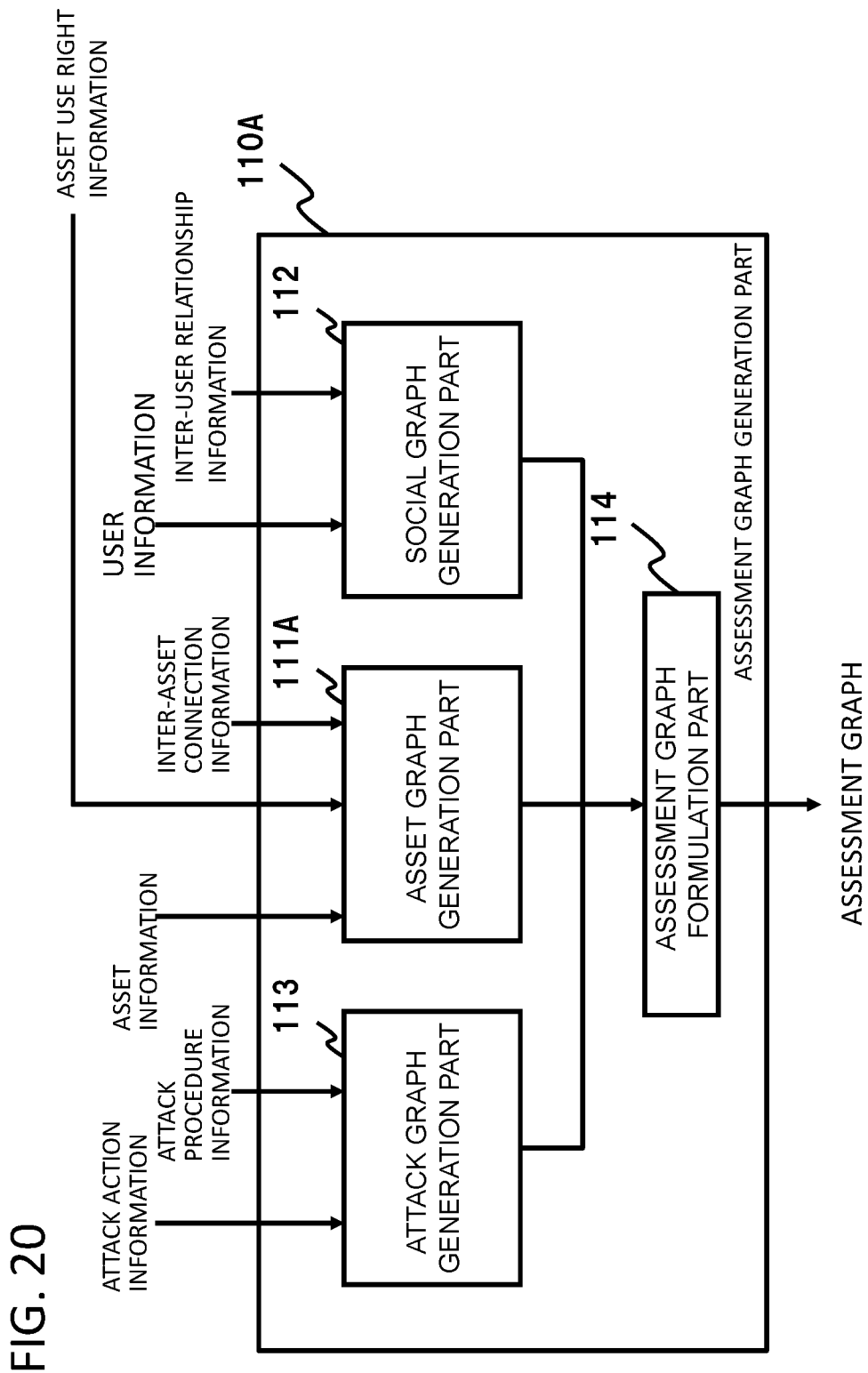
FIG. 20 illustrates an example of a configuration of an assessment graph generation part of the security evaluation system according to the second exemplary embodiment of the present invention.

FIG. 20 illustrates an example of a configuration of an assessment graph generation part 110A according to the present exemplary embodiment. The difference from the assessment graph generation part shown in FIG. 4 is that asset use right information is input to an asset graph generation part 111A.

Figure 21:
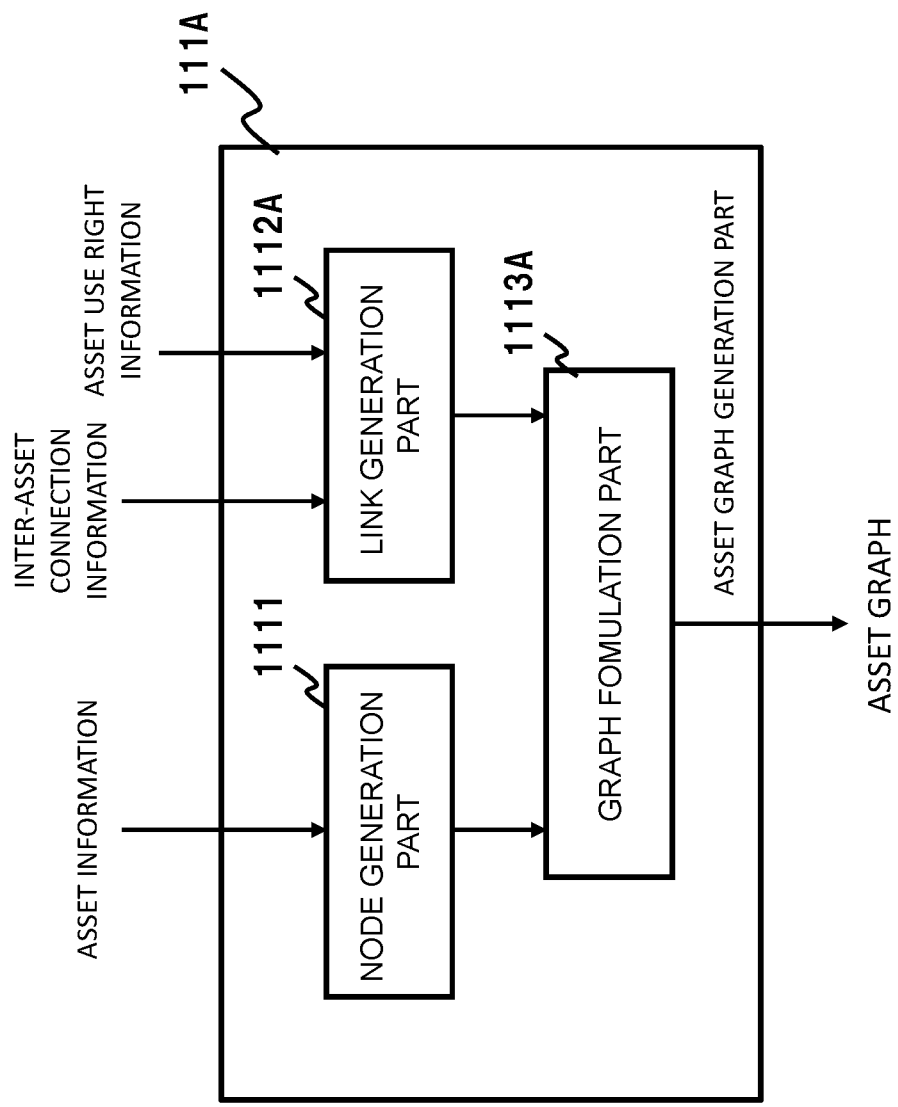
FIG. 21 illustrates an example of a configuration of an asset graph generation part of the security evaluation system according to the second exemplary embodiment of the present invention.

FIG. 21 illustrates an example of a configuration of an asset graph generation part 111A according to the present exemplary embodiment. The difference from the asset graph generation part as shown in FIG. 5 is that asset use right information is input to a link generation part 1112A and the link generation part 1112A append asset use right information as an additional information of a link.

Figure 24:
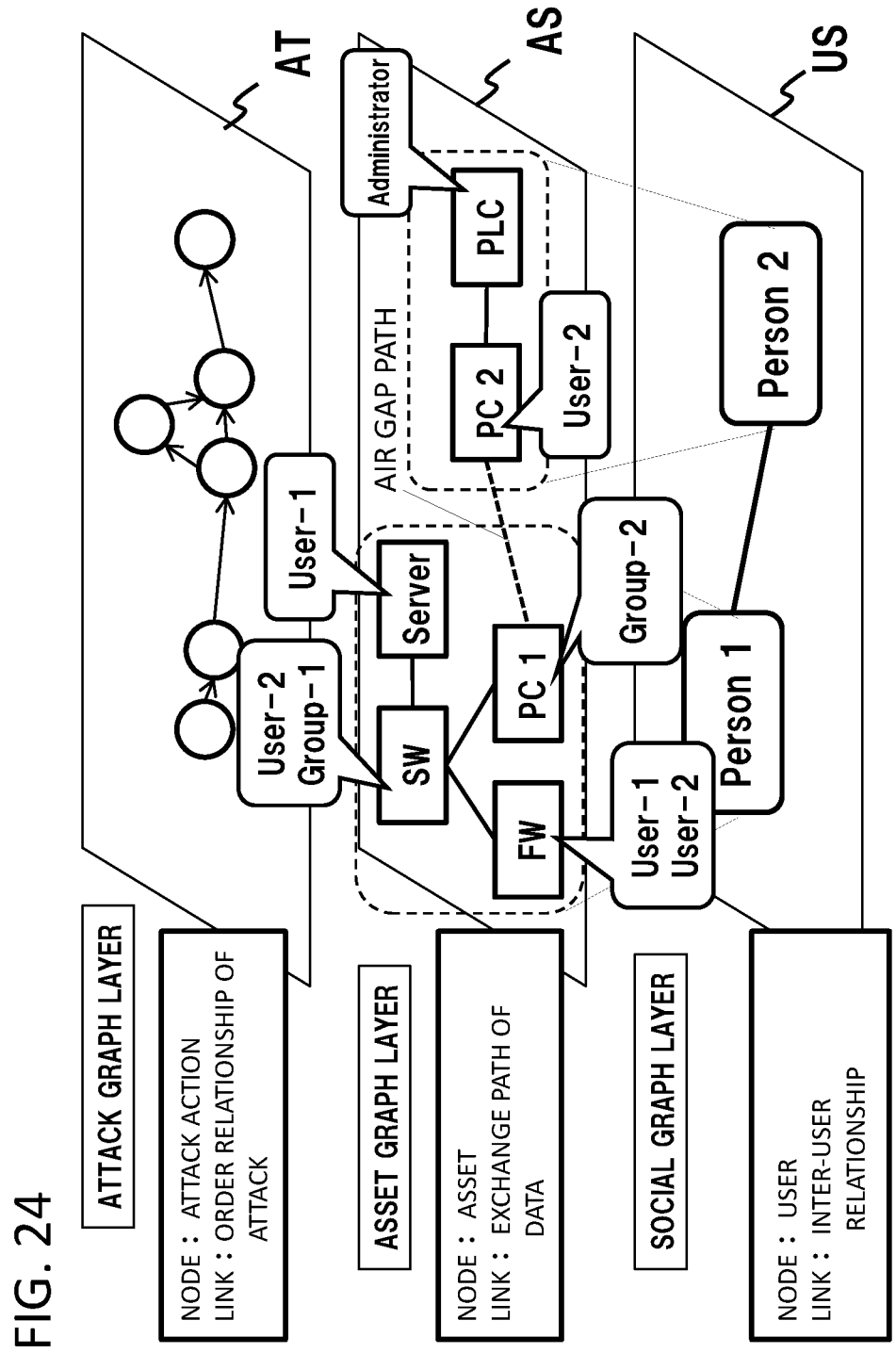
FIG. 24 illustrates an example of an assessment graph displayed by the security evaluation system according to the second exemplary embodiment of the present invention.

Then, a graph formulation part 1113A of the asset graph generation part 111A of the present exemplary embodiment formulates an asset graph in which access right information is appended (see FIG. 24).

FIG. 22 illustrates an example of asset use right information held by an asset use right information storage part 104. In the example shown in FIG. 22, User-1 and User-2 are defined as users having use right to the asset (Firewall) identified by the ID of asset-node:1. Similarly, User-2 and Group-1 are defined as users who have an access right to the asset (Switch) identified by the ID of asset-node:2. As described above, it is also possible to define a group as a user having use right. It should be noted that a user here is only a user who has use right of an asset. On the other hand, a user (Person) on a social graph is a person who exists as an entity. The two may be the same but may be different. For example, when a certain PC is shared by a shared account (share-user), it is treated as a single user on an asset graph but another person on a social graph. Conversely, a real person may have a plurality of accounts (administrator and general user) for a certain asset. In this case, the user is treated as another user on an asset graph but is the same person on a social graph.

Figure 23:
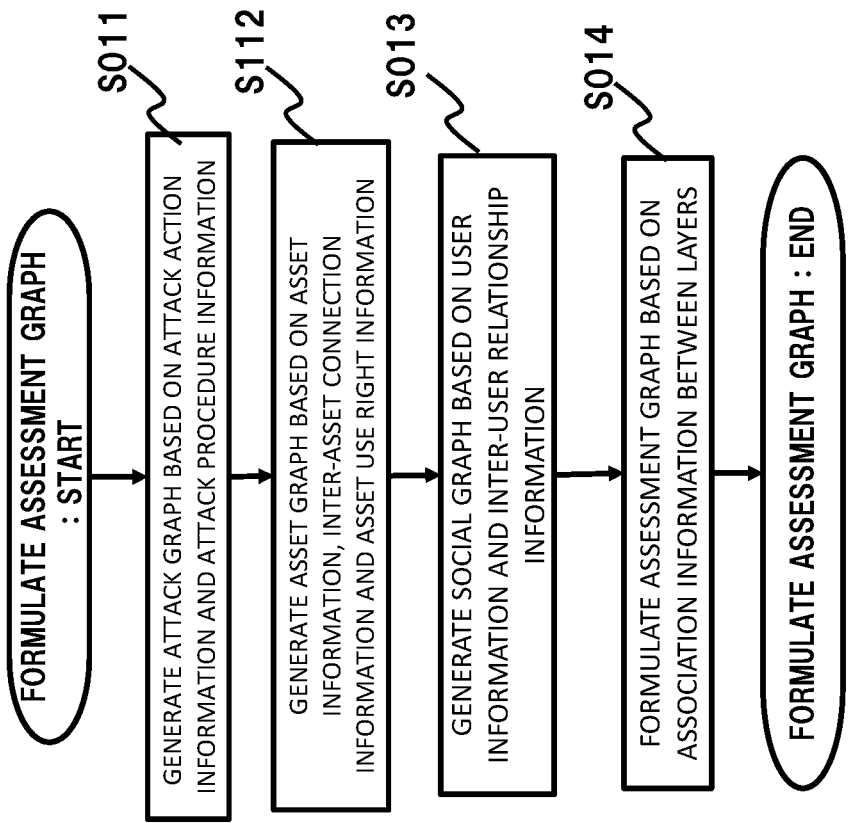
FIG. 23 illustrates a flowchart representing an example of an assessment graph generation process by the security evaluation system according to the second exemplary embodiment of the present invention.

FIG. 23 illustrates a flowchart representing an example of the assessment graph generation processing of the security evaluation system according to the second exemplary embodiment of the present invention. The difference from the flowchart of the first exemplary embodiment as shown in FIG. 15 is that in step S112, the asset graph generation unit 111A generates an asset graph based on the asset information, the inter-asset connection information and the asset use right information. The other processing is the same as that of the first exemplary embodiment, and thus the description is omitted.

FIG. 24 illustrates an example of an assessment graph displayed by the security evaluation system 100A according to the second exemplary embodiment of the present invention. The difference from an assessment graph displayed by the security evaluation system 100 according to the first exemplary embodiment shown in FIGS. 16 to 18 is that information of a user(s) having use right of each asset is (are) displayed as additional information in an asset graph.

According to the present exemplary embodiment, in addition to the effect of the first exemplary embodiment, it is possible to grasp what use right is given to an asset and a correspondence relationship between the use right and an actual user.

In the above description, the asset use right information storage part 104 is independently provided in the security evaluation system 100A, but a configuration in which the asset use right information storage part 104 may be omitted can be adopted. For example, as shown in FIG. 25, it is possible to adopt a mode in which an asset use right field for storing asset use right information is appended to the asset information and held therein.

In addition, in the above-described exemplary embodiment, the example in which information of a user who has use right is defined as an asset use right information has been described. However, for example, correspondence relationship between a user of an asset layer and a user (Person) of a social layer may be held.

Third Exemplary Embodiment

Figure 26:
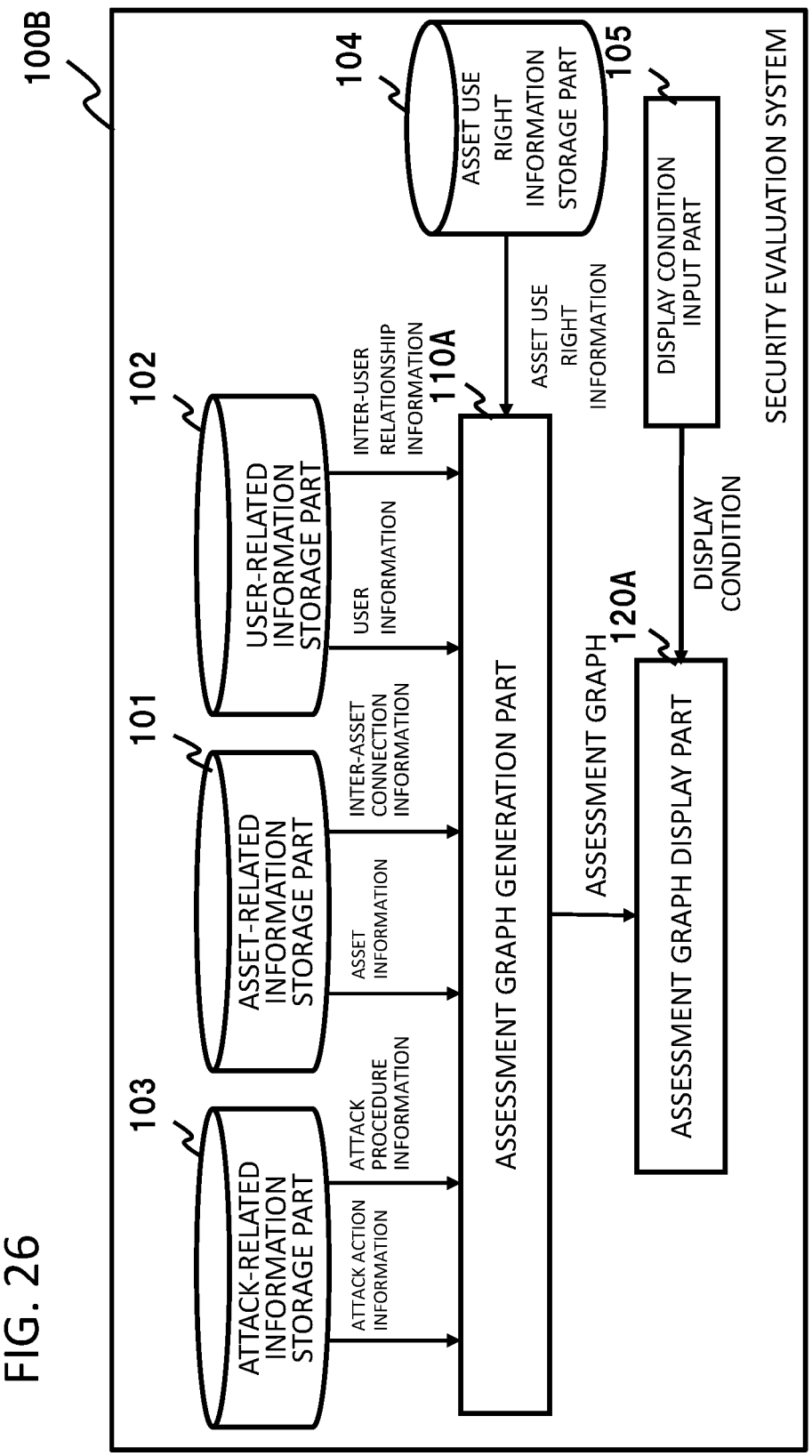
FIG. 26 illustrates a configuration of a security evaluation system according to a third exemplary embodiment of the present invention.

Next, a third exemplary embodiment in which the display mode of the assessment graph can be changed will be described in detail with reference to the drawings. FIG. 26 illustrates a configuration of a security evaluation system 100B according to a third exemplary embodiment of the present invention. The configuration difference from the security evaluation system 100A of the second exemplary embodiment shown in FIG. 19 is that a display condition input part 105 is added, and an assessment graph display part 120A changes a display mode of an assessment graph according to an input display condition. In this exemplary embodiment, an asset type field indicating a type of an asset is added to asset information. Other configurations are the same as those of the first and second exemplary embodiments, and therefore, the differences will be mainly described below.

FIG. 27 illustrates an example of asset information held by the security evaluation system according to the third exemplary embodiment of the present invention. The difference from the asset information shown in FIG. 6 is that an asset type field has been added so that an asset type of a node on an asset graph can be identified.

The display condition input part 105 receives input of display conditions for displaying an assessment graph from a system evaluator or the like and transmits the input to the assessment graph display part 120A. The display conditions here may include a node ID of each layer and its attributes. For example, an attack ID corresponding to a node in an attack graph may be designated. Similarly, an asset type, an asset ID, and a connection type of a link in an asset graph may be designated. Similarly, a user ID and access right information in a social graph may be designated.

The assessment graph display part 120A displays an assessment graph according to a display condition designated by the display condition input part 105.

Figure 28:
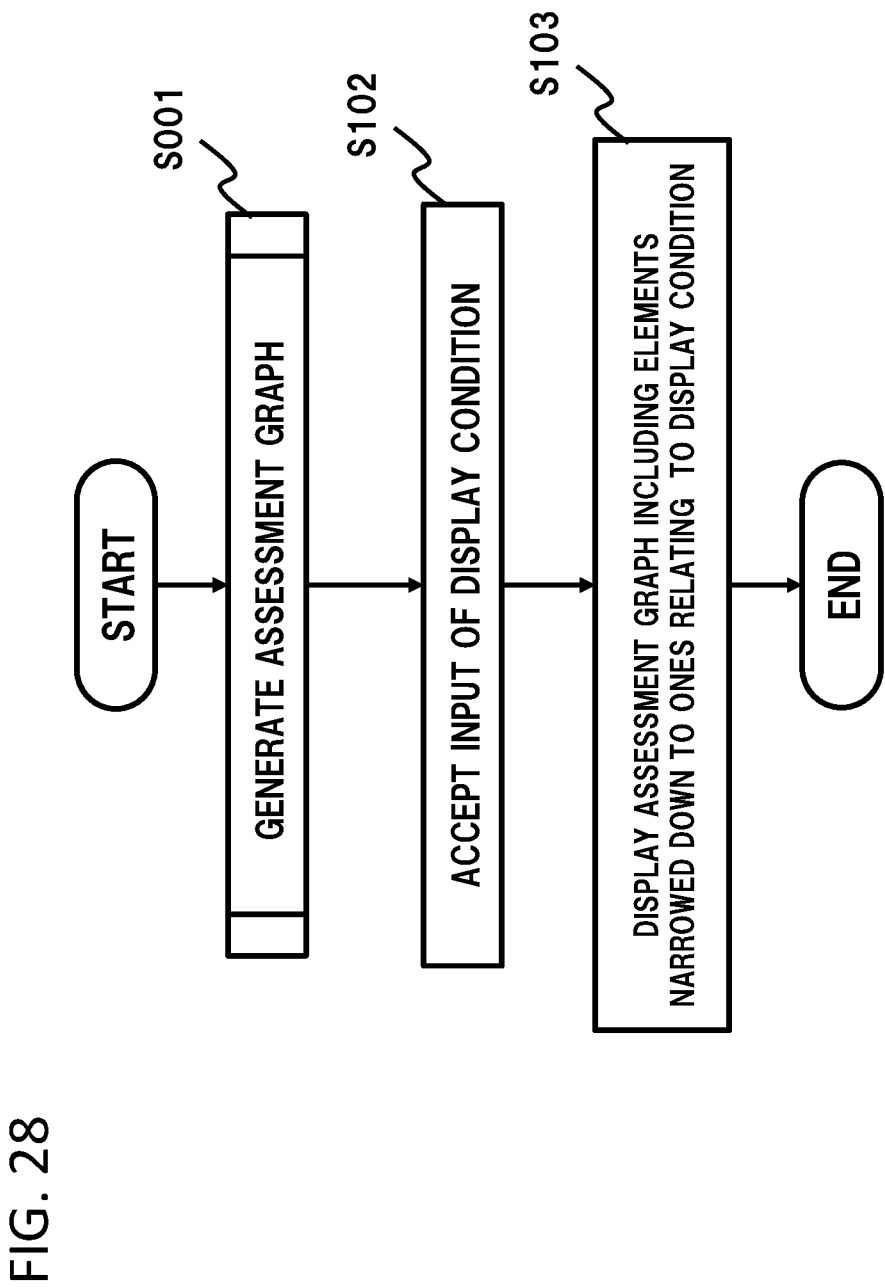
FIG. 28 illustrates a flowchart of an operation of the security evaluation system according to the third exemplary embodiment of the present invention.

Subsequently, an operation of the present exemplary embodiment will be described in detail with reference to the drawings. FIG. 28 illustrates a flowchart of an operation of the security evaluation system 100B according to the present exemplary embodiment. The difference from the operation of the security evaluation system 100 according to the first embodiment shown in FIG. 14 is that in step S102, input of display condition is accepted, and a display mode of an assessment graph is changed according to the display conditions (steps S102 and S103 in FIG. 28).

Figure 29:
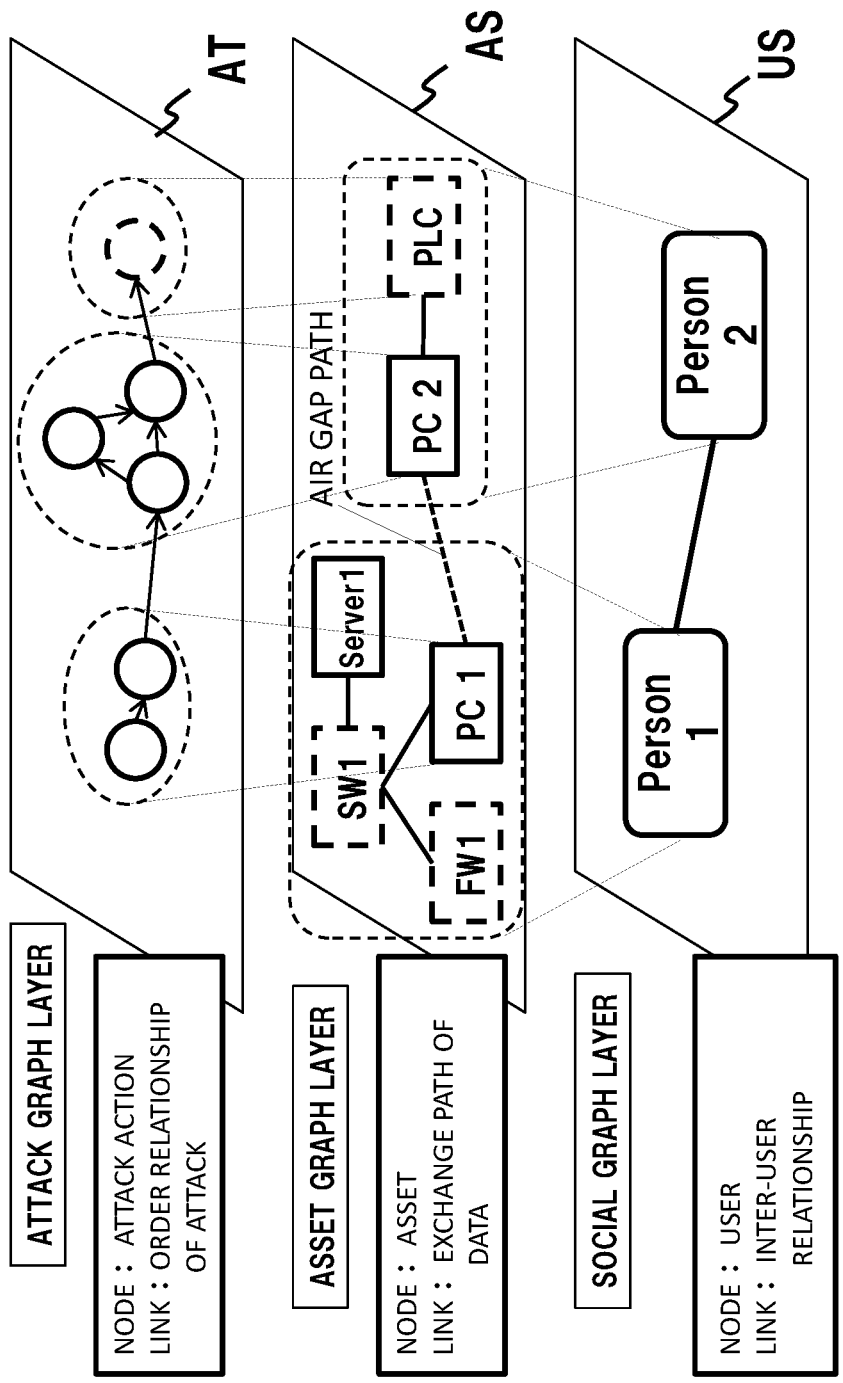
FIG. 29 illustrates an example of an assessment graph displayed by the security evaluation system according to the third exemplary embodiment of the present invention.

The input of the display condition and the display mode of the assessment graph will be concretely described with reference to FIGS. 29 to 31. FIG. 29 illustrates an assessment graph displayed when an asset type=Computer is designated as a display condition in the display condition input part 105. Because the asset type=Computer is designated as the display condition, Server-1, PC-1, and PC-2 of asset-node:3 to 5 are identified from asset information shown in FIG. 27. Then, the assessment graph display part 120A displays an asset graph (partial graph) representing at least Server-1, PC-1 and PC-2 as nodes as an asset graph (AS). The other nodes in the asset graph may be represented by broken lines as shown in FIG. 29 or may not be displayed. Further, in the example of FIG. 29, in an attack graph (AT), nodes of the attack graph corresponding to the above-mentioned Server-1, PC-1 and PC-2 are represented by solid lines, and correspondence relation is indicated by broken lines. In the example of FIG. 29, in a social graph, a user (person) who has an ownership relationship with Server-1, PC-1 and PC-2 are represented by a solid line and correspondence relation is represented by a broken line. According to such an assessment graph, it is possible to confirm whether or not there is an attack graph related to an arbitrary asset and a user (person) having an ownership relationship thereof.

Figure 30:
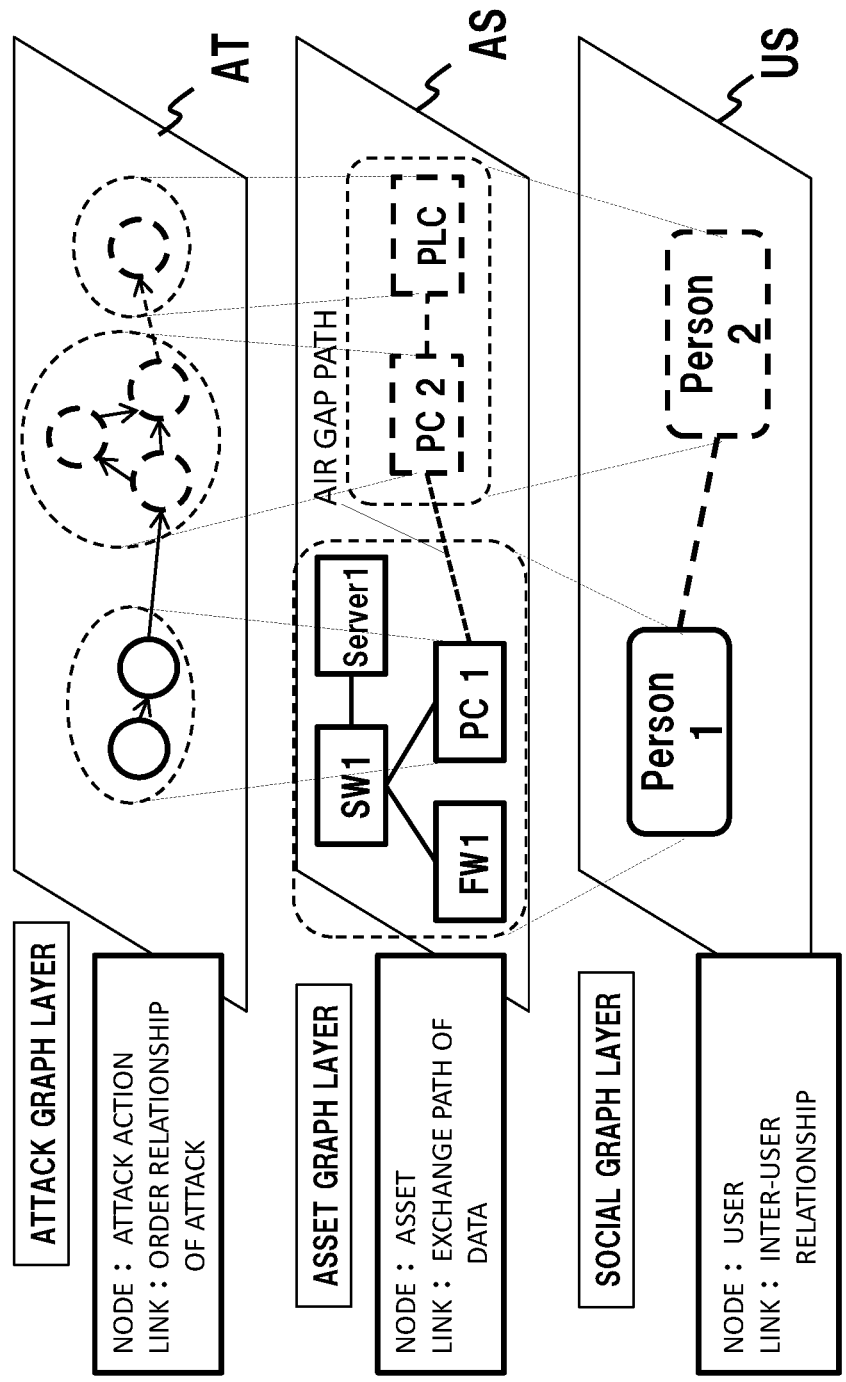
FIG. 30 illustrates another example of an assessment graph displayed by the security evaluation system according to the third exemplary embodiment of the present invention.

FIG. 30 illustrates an assessment graph displayed when 'Person 1 of a social graph is designated as a display condition in the display condition input part 105. Because the user name=Person 1 is designated as a display condition, Firewall-1, Switch-1, Server-1 and PC-1 with an owner user ID of person-node:1 are identified from the asset information shown in FIG. 27. Then, the assessment graph display part 120A displays an asset graph (partial graph AS) representing at least nodes of Firewall-1 (FW1), Switch-1 (SW1), Server-1 and PC-1 as an asset graph. The other nodes in the asset graph may be represented by broken lines as shown in FIG. 30 or may not be displayed. Further, in the example of FIG. 30, in an attack graph (AT), nodes of the attack graph corresponding to the above-described Firewall-1, Switch-1, Server-1 and PC-1 are represented by solid lines, and correspondence relation is represented by broken lines. In the example of FIG. 30, in a social graph (PH), the Person 1 is represented by a solid line, and correspondence relation is indicated by broken lines. According to such an assessment graph, it is possible to confirm whether or not there is an attack graph or an asset(s) with which a user has an ownership relations with an arbitrary user (person).

Figure 31:
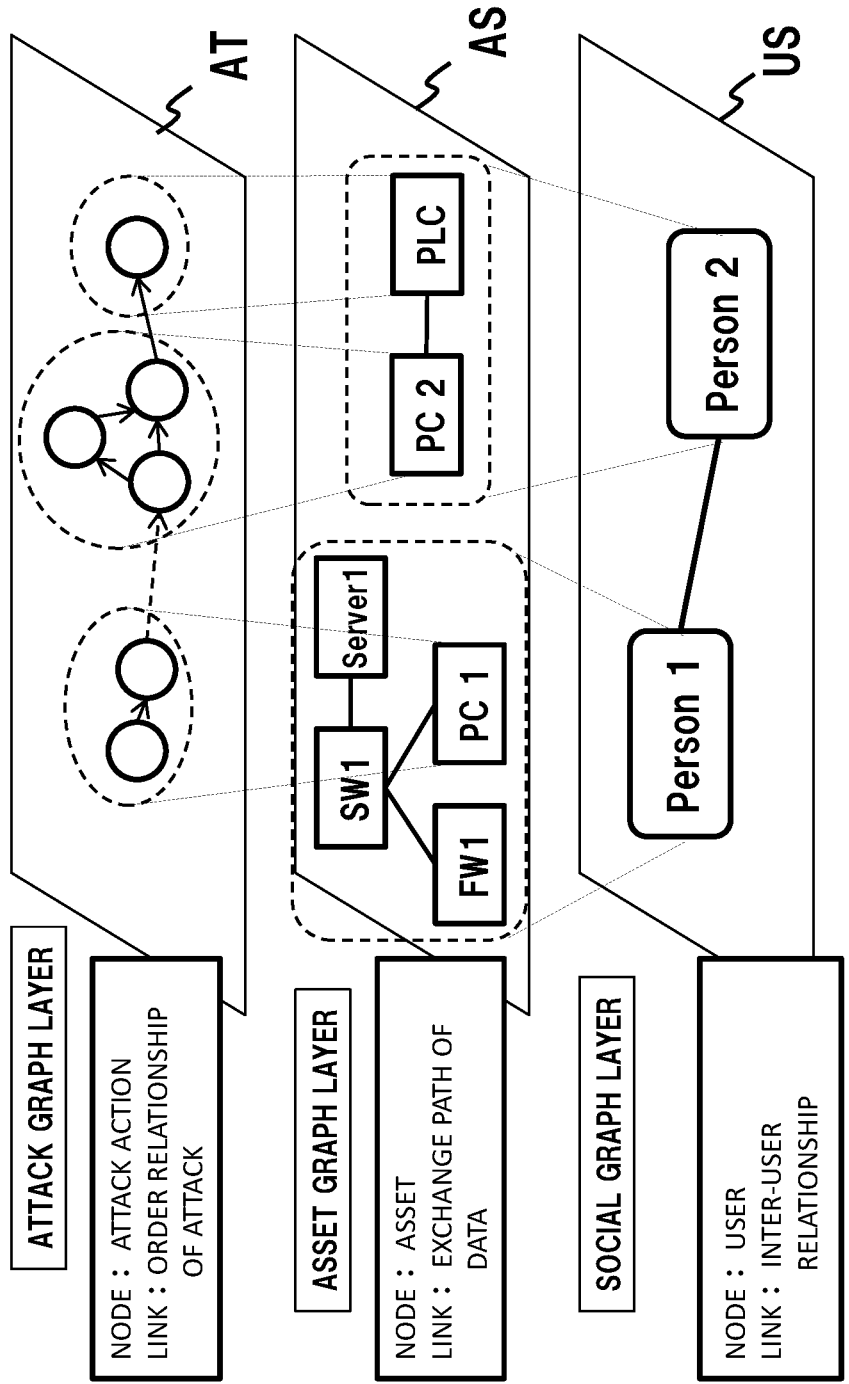
FIG. 31 illustrates a further example of an assessment graph displayed by the security evaluation system according to the third exemplary embodiment of the present invention.

FIG. 31 illustrates an assessment graph displayed when a connection type of a link of an asset graph is designated to other than USB as a display condition in the display condition input part 105, that is, when "the presence of an air gap path is not a condition" is designated. Because the connection type=NOT (USB) is designated as the display condition, an entry of which connection type is other than USB is selected from inter-asset connection information of FIG. 7. Thereby, a link between PC1 and PC2 is not displayed in an asset graph. Further, in the example of FIG. 31, a link corresponding to an air gap path between PC1 and PC2 is represented by a broken line in an attack graph (AT). This shows that this attack graph cannot be established without the existence of the air gap path. Note that, although the example of FIG. 31 displays an attack graph, the attack graph may not be displayed in a case where it cannot be established without the presence of the air gap path.

The display condition is not limited to the above example, and any item of asset information, inter-asset connection information, user information, inter-user relationship information, attack action information, attack procedure information, and access right information can be designated. For example, as the display condition, based on a designation by an arbitrary user, an attack graph or an asset graph displaying only the assets to which the user has the use right may be displayed. Similarly, for example, based on a designation of an arbitrary node (attack action) in an attack graph as a display condition, an asset of an asset graph that is a target of a node (attack action) and a user (person) who has an ownership with the asset may be displayed.

In a more desirable mode, when a link (path) of an attack graph is given weight information or the like calculated based on degree of influence (severity), difficulty of attack action, or the like, a path of an attack graph may be switched-over to be displayed or not based on these values. As these values, CVSS values known as Common Vulnerability Scoring System may be used, too.

As described above, each of exemplary embodiments of the present invention has been described. However, the present invention is not limited to the above-described exemplary embodiments, and further modifications, substitutions, and adjustments made without departing from the basic technical concept of the present invention can be added to. For example, the network configuration, the configuration of each element, and the expression form of a message illustrated in each drawing are examples for helping the understanding of the present invention and are not limited to the configurations illustrated in these drawings. In the following description, "A and/or B" is used to mean at least one of A or B.

Figure 32:
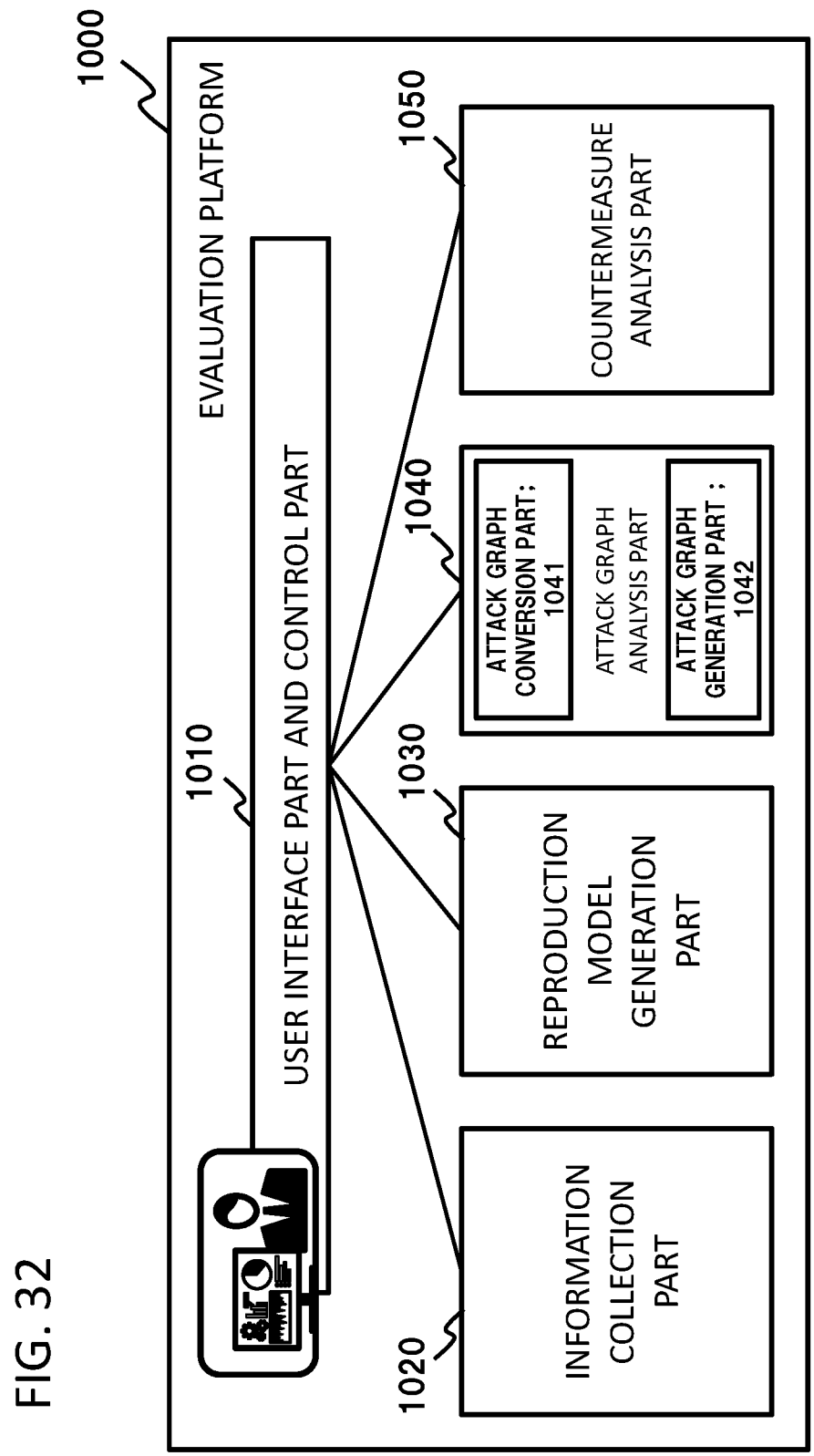
FIG. 32 illustrates an example of a security evaluation platform that can cooperate with the present invention.

Although not particularly mentioned in the above exemplary embodiments, the present invention can also be applied as a subsystem of an evaluation platform 1000 of a system using a digital shadow as shown in FIG. 32. Here, the digital shadow is a method of evaluating security of a system using a reproduction model of a real system, also called a digital twin, and is suitable to use for systems in which it is difficult to perform tests on a real system such as a power plant system. In the example of FIG. 32, an evaluation platform 1000 including an information collection part 1020, a reproduction model generation part 1030, an attack graph analysis part 1040 and a countermeasure analysis part 1050 is illustrated. The attack graph analysis part 1040 among these corresponds to the above-described attack graph generation part 113. For example, the present invention can be configured as a system that operates in cooperation with the attack graph analysis part 1040 shown in FIG. 32.

Figure 33:
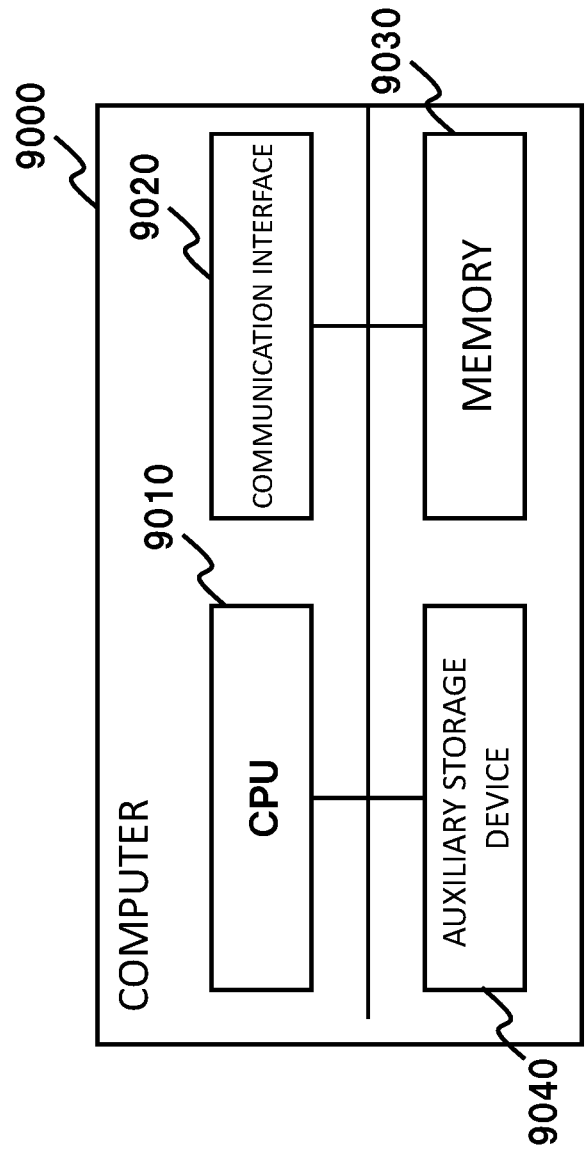
FIG. 33 illustrates a configuration of a computer formulating a security evaluation system of the present invention.

Procedures described in the first to third exemplary embodiments can be realized by a program that causes a computer (9000 in FIG. 33) functioning as a security evaluation system 100, 100A, and 100B to perform functions of a security evaluation system 100. Such a computer is exemplified by a configuration including a CPU (Central Processing Part) 9010, a communication interface 9020, a memory 9030, and an auxiliary storage device 9040 as shown in FIG. 33. That is, the CPU 9010 shown in FIG. 33 may execute an assessment graph generation program or an assessment graph display program and update the calculation parameters stored in the auxiliary storage device 9040 or the like.

That is, each part (processing means, function) of a security evaluation system as shown in the first to third exemplary embodiments can be realized by a computer program that causes a processor of the computer to execute each of the above processes using its hardware.

Finally, preferred exemplary embodiments of the present invention are summarized.

[Mode 1]
(Refer to the security evaluation system of the first aspect.)

[Mode 2]

It is preferable that the first graph generation part of the security evaluation system generates a first evaluation graph representing a data exchange path by way of a medium between the resources based on connection information between resources defining a data exchange path including a data exchange path by way of a medium between the resources.

[Mode 3]

It is preferable that the second graph generation part of the security evaluation system generates a second evaluation graph in which a user having an access right of the resources is represented as a node and an inter-user relationship through which an exchange of a media can be performed is represented as a link.

[Mode 4]

The security evaluation system can further have a configuration including:

a use right storage part that stores information of a user who has use right of the resource, wherein the display part displays information of a user who has use right of the resources as additional information of the first evaluation graph.

[Mode 5]

The security evaluation system can further have a configuration including:

a third graph generating part that generates an attack graph for a resource as a target for the security evaluation, wherein the display part further displays the first evaluation graph and the attack graph in association with each other.

[Mode 6]

The security evaluation system can further have a configuration including:

a condition receiving part that receives a display condition including at least one designation of ID of the resource or type of the resource, wherein the display part displays a resource corresponding to the display condition of the first evaluation graph and the second evaluation graph corresponding to the resource or an attack graph related to the resource.

[Mode 7]

The security evaluation system can further have a configuration including:

a condition receiving part that receives a display condition including designation of the user, wherein the display part displays a user corresponding to the display condition of the second evaluation graph, a partial graph of the first evaluation graph related to the user and an attack graph related to the partial graph.

[Mode 8]

The security evaluation system can further have a configuration including:

a condition receiving part that receives designation of the presence or absence of a data exchange path by way of a medium between the resources among the data exchange paths, wherein the display part displays a first evaluation graph without a data exchange path by way of a medium between the resources and an attack graph that does not need presence of a data exchange path by dislocation of a medium between the resources among attack graphs related to the first evaluation graph when the designation of absence of the data exchange path by way of the medium between the resources is received.

[Mode 9]

The security evaluation system can further have a configuration including:

a condition receiving part that receives a display condition including designation of the user, wherein the display part selects a space in the second evaluation graph which the user is allowed to enter, and displays a partial graph of the first evaluation graph located in the space and an attack graph and the second evaluation graph related to the partial graph.

[Mode 10]

The security evaluation system can further have a configuration including:

a condition receiving part that receives a display condition including designation of a node of the attack graph;

wherein the display part displays a partial graph of the first evaluation graph related to the designated node of the attack graph and a partial graph of the second evaluation graph related to the partial graph.

[Mode 11]

(Refer to the security evaluation provision method of the second aspect.)

[Mode 12]

(Refer to the program of the third aspect.)

The modes 11 to 12 can be expanded to the second to tenth modes as is the case with the first mode.

The disclosures of the above patent literatures are incorporated herein by reference. Modifications and adjustments of the exemplary embodiments or examples are possible within the ambit of the entire disclosure (including the claims) of the present invention and based on the basic technical concept thereof. In addition, various combinations of various disclosed elements (including each element of each claim, each element of each exemplary embodiment or example, each element of each drawing, and the like) or selection are possible within the scope of the disclosure of the present invention. That is, the present invention of course includes various variations and modifications that could be made by those skilled in the art according to the entire disclosure including the claims and the technical concept. In particular, with respect to the numerical ranges described herein, any numerical values or small range(s) included in the ranges should be construed as being expressly described even if not otherwise explicitly recited.

REFERENCE SIGNS LIST

1, 100, 100A, 100B security evaluation system
10 first graph generation part
20 second graph generation part
30 display part
101 asset-related information storage part
102 user-related information storage part
103 attack-related information storage part
104 asset use right information storage part
105 display condition input part
110, 110A assessment graph generation part
111, 111A asset graph generation part
112, 112A social graph generation part
113 attack graph generation part
114 assessment graph formulation part
120, 120A assessment graph display part
1000 evaluation platform
1010 user interface part and control part
1020 information collection part
1030 reproduction model generation part
1040 attack graph analysis part 1050 countermeasure analysis part
1111, 1121, 1131 node generation part
1112, 1112A, 1122, 1132 link generation part
1113, 1113A, 1123, 1133 graph formulation part
9000 computer
9010 CPU
9020 communication interface
9030 memory
9040 auxiliary storage device
AT attack graph layer
AS asset graph layer
US social graph layer

What is claimed is:

1. A security evaluation system comprising:
at least a processor; and
a memory in circuit communication with the processor,
wherein the processor is configured to execute program instructions stored in the memory to:
generate a first evaluation graph representing a connection relationship by a link between resources represented by nodes that are a target for security evaluation;
generate a second evaluation graph representing a personal relationship between users who can access the resources, wherein in the second evaluation graph, a user having an access right to the resources is represented as a node and an inter-user relationship through which an exchange of a medium can be performed is represented as a link;
wherein the first evaluation graph represents a data exchange path that is an air gap path by way of a medium between the resources, and the first evaluation graph is generated based on connection information between the resources defining the data exchange path that is the air gap path by way of the medium between the resources; and
display the first evaluation graph and the second evaluation graph in association with each other,
wherein the first evaluation graph and the second evaluation graph permit risk assessment of a computer system security incident on which basis a countermeasure can be undertaken as a result,
and wherein the countermeasure is undertaken based on the risk assessment of the computer system security incident permitted by the first evaluation graph and the second evaluation graph.

2. The security evaluation system according to claim 1, wherein the processor is configured to execute the program instructions to further:
stores information of a user who has use right of the resources,
wherein the first evaluation graph further includes information of the user who has the use right of the resources, as additional information of the first evaluation graph.

3. The security evaluation system according to claim 1, wherein the processor is configured to execute the program instructions to further:
generate an attack graph representing an assumed attack procedure by the link for the resources represented by the nodes that are the target for the security evaluation; and
display the attack graph in association with the first evaluation graph.

4. The security evaluation system according to claim 1, wherein the processor is configured to execute the program instructions to further:
receive a display condition including at least one designation of ID of the resources or type of the resources; and
display the resources corresponding to the display condition of the first evaluation graph and the second evaluation graph corresponding to the resources or an attack graph related to the resources.

5. The security evaluation system according to claim 1, wherein the processor is configured to execute the program instructions to further:
receive a display condition including designation of the user; and
display the user corresponding to the display condition of the second evaluation graph, a partial graph of the first evaluation graph related to the user, and an attack graph related to the partial graph.

6. The security evaluation system according to claim 1, wherein the processor is configured to execute the program instructions to further: receive designation of absence of the data exchange path; and display the first evaluation graph without the data and an attack graph that does not need presence of the data exchange path, when the designation of absence of the data exchange path is received.

7. A security evaluation method performed by a computer, comprising:
generating a first evaluation graph representing a connection relationship by a link between resources represented by nodes that are a target for security evaluation;
generating a second evaluation graph representing a personal relationship between users who can access the resources, wherein in the second evaluation graph, a user having an access right to the resources is represented as a node and an inter-user relationship through which an exchange of a medium can be performed is represented as a link;
wherein the first evaluation graph represents a data exchange path that is an air gap path by way of a medium between the resources, and the first evaluation graph is generated based on connection information between the resources defining the data exchange path that is the air gap path by way of the medium between the resources; and
displaying the first evaluation graph and the second evaluation graph in association with each other,
wherein the first evaluation graph and the second evaluation graph permit risk assessment of a computer system security on which basis a countermeasure can be undertaken as a result,
and wherein the countermeasure is undertaken based on the risk assessment of the computer system security incident permitted by the first evaluation graph and the second evaluation graph.

8. The method according to claim 7,
wherein the first evaluation graph further represents a data exchange path between the resources that is generated based on the connection information between the resources.

9. The method according to claim 7, further comprising:
storing information of a user who has a use right of the resources,
wherein the first evaluation graph further includes information of the user who has the use right of the resources as additional information of the first evaluation graph.

10. The method according to claim 7, further comprising:
generating an attack graph for the resources that are the target for the security evaluation;

displaying the attack graph in associate with the first evaluation graph.

11. The method according to claim 7, further comprising:

receiving a display condition including at least one designation of ID of the resources or type of the resources; and displaying the resource corresponding to the display condition of the first evaluation graph and the second evaluation graph corresponding to the resource or an attack graph related to the resources.

12. A computer-readable non-transient recording medium recording a program, the program causing a computer comprising a processor and a recording device to perform a process comprising:

generating a first evaluation graph representing a connection relationship by a link between resources represented by nodes that are a target for security evaluation;

generating a second evaluation graph representing a personal relationship between users who can access the resources, wherein in the second evaluation graph, a user having an access right to the resources is represented as a node and an inter-user relationship through which an exchange of a medium can be performed is represented as a link;

wherein the first evaluation graph represents a data exchange path that is an air gap path by way of a medium between the resources, and the first evaluation graph is generated based on connection information between the resources defining the data exchange path that is the air gap path by way of the medium between the resources; and displaying the first evaluation graph and the second evaluation graph in association with each other, wherein the first evaluation graph and the second evaluation graph permit risk assessment of a computer system security on which basis a countermeasure can be undertaken as a result, and wherein the countermeasure is undertaken based on the risk assessment of the computer system security incident permitted by the first evaluation graph and the second evaluation graph.

13. The medium according to claim 12, wherein the first evaluation graph further represents a data exchange path between the resources that is generated based on the connection information between the resources.

14. The medium according to claim 12, wherein the process further comprises:

storing information of a user who has a use right of the resources, wherein the first evaluation graph further includes information of the user who has the use right of the resources as additional information of the first evaluation graph.

15. The medium according to claim 12, wherein the process further comprises:

generating an attack graph for the resources that are the target for the security evaluation;

displaying the attack graph in associate with the first evaluation graph.

16. The medium according to claim 12, wherein the process further comprises:

receiving a display condition including at least one designation of ID of the resources or type of the resources; and displaying the resource corresponding to the display condition of the first evaluation graph and the second evaluation graph corresponding to the resource or an attack graph related to the resources.

* * * * *